US006747790B2

(12) United States Patent
Onaka et al.

(10) Patent No.: US 6,747,790 B2
(45) Date of Patent: Jun. 8, 2004

(54) OPTICAL AMPLIFIER FOR AMPLIFYING MULTI-WAVELENGTH LIGHT

(75) Inventors: Miki Onaka, Kawasaki (JP); Yasushi Sugaya, Kawasaki (JP); Etsuko Hayashi, Kawasaki (JP); Norifumi Shukunami, Sapporo (JP); Manabu Watanabe, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 10/032,095

(22) Filed: Dec. 31, 2001

(65) Prior Publication Data

US 2002/0191276 A1 Dec. 19, 2002

(30) Foreign Application Priority Data

Jun. 14, 2001 (JP) .......................... 2001-180779

(51) Int. Cl.[7] ................................ H01S 3/00
(52) U.S. Cl. ..................... 359/337; 359/341.1
(58) Field of Search .................. 359/337, 341.1

(56) References Cited

U.S. PATENT DOCUMENTS 6,292,289 B1 * 9/2001 Sugaya et al. .............. 359/337
6,459,526 B1 * 10/2002 Minelly et al. .......... 359/337.1
6,529,317 B2 * 3/2003 Choi et al. ............. 359/341.31
6,597,493 B2 * 7/2003 Islam ........................ 359/334

* cited by examiner

*Primary Examiner*—Mark Hellner
(74) *Attorney, Agent, or Firm*—Staas & Halsey LLP

(57) ABSTRACT

Multi-wavelength light is inputted to an erbium-doped fiber as an optical amplification medium. Pump light is supplied to this erbium-doped fiber. When a transition from a state signal light on the short wavelength area in the multi-wavelength is input in the erbium-doped fiber to a state the signal light is not input, the output power of signal light on the long wavelength area in the multi-wavelength light can vary. The wavelength of pump light is selected in such a way that the output power of the signal light on the long wavelength area can not be negative when the power varies.

14 Claims, 22 Drawing Sheets

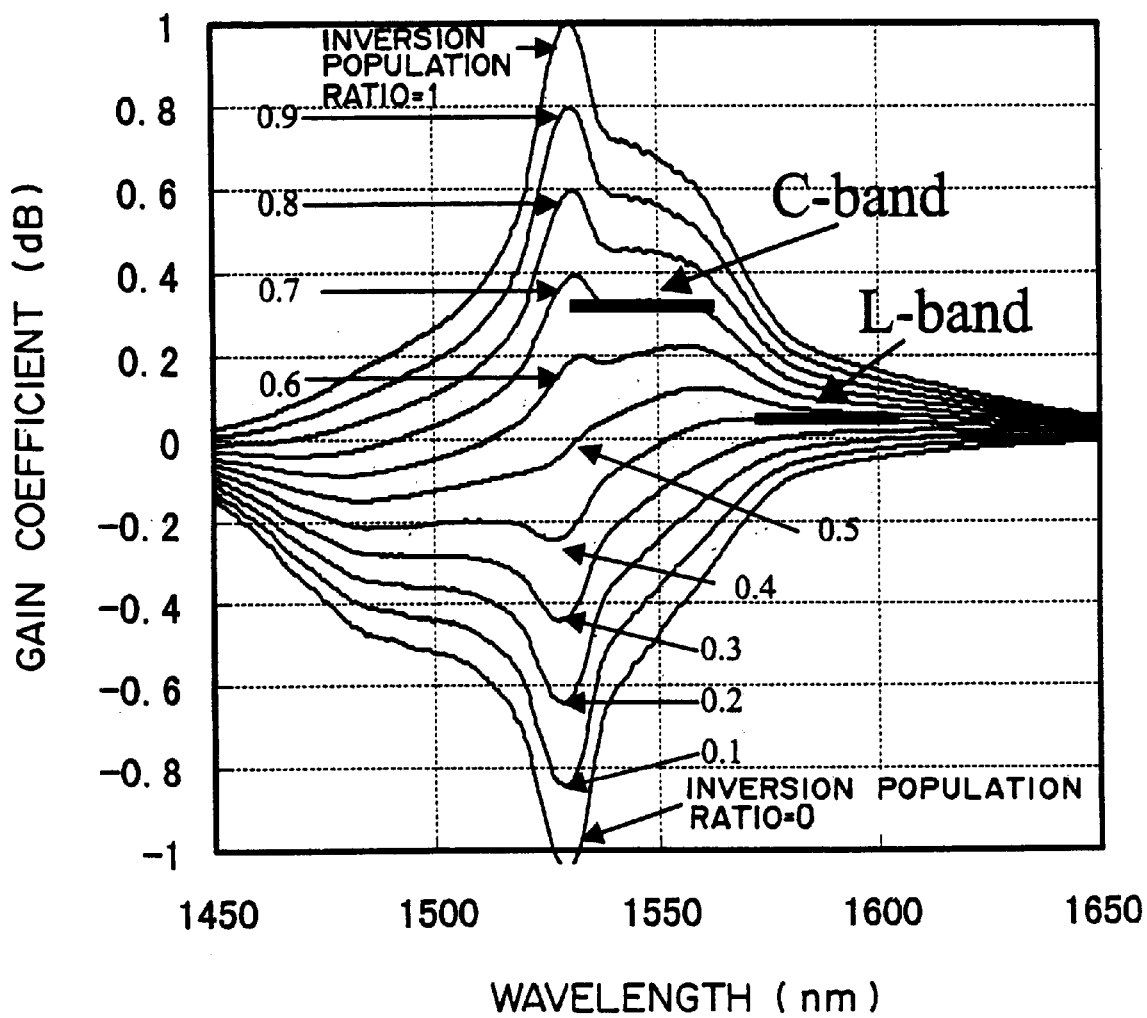
F I G. 1

DEVIATION : A VALUE OBTAINED BY SUBTRACTING A ch80 OUTPUT POWER IN THE CASE WHERE BOTH ch1 AND ch80 ARE INPUTTED FROM ch80 OUTPUT POWER IN THE CASE WHERE ONLY ch80 IS INPUTTED.

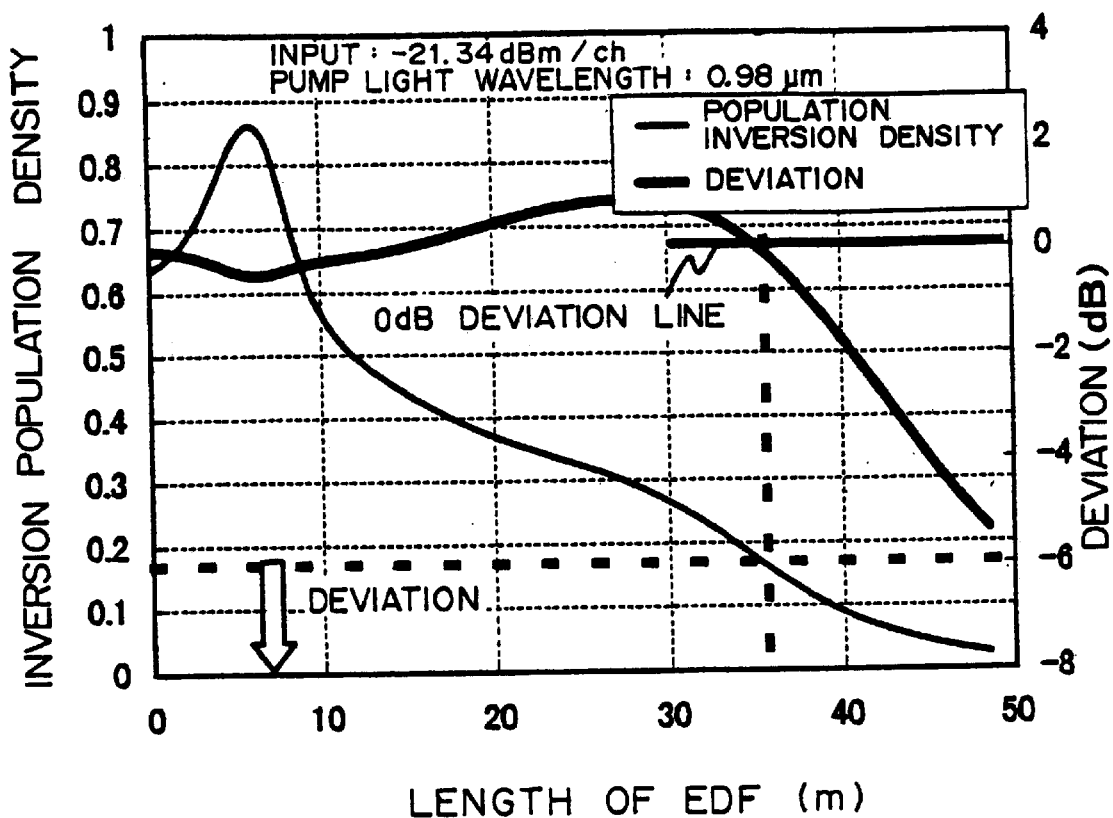
F I G. 12

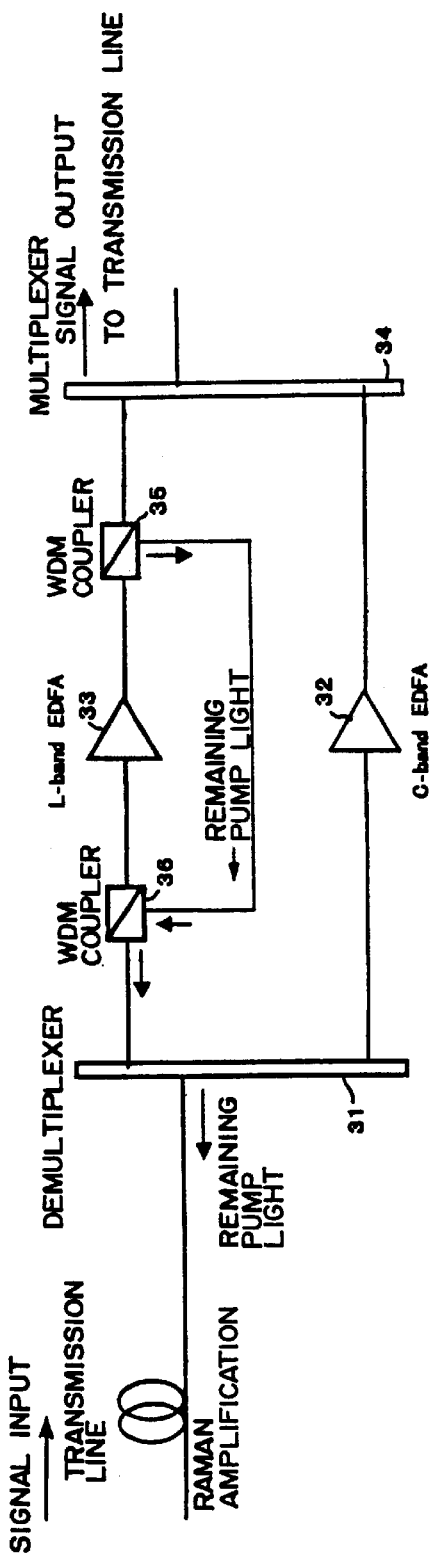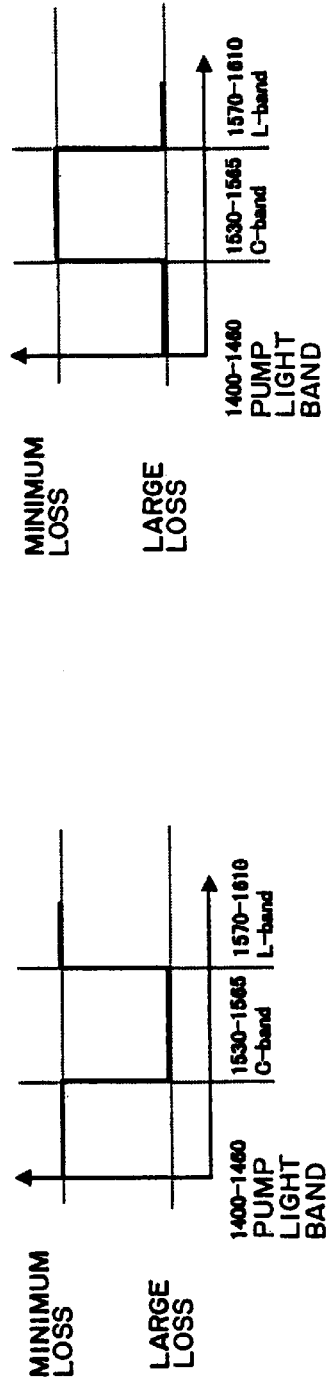
FIG. 19A
FIG. 19B
FIG. 19C

OPTICAL AMPLIFIER FOR AMPLIFYING MULTI-WAVELENGTH LIGHT

CROSS REFERENCE

Ser. No. 09/949,873 and an application in Japan 2000-382711 (which was filed in United States on Dec. 13, 2001, but serial number was not assigned yet) are hereby incorporated by reference.

BACKGROUND OF THE INVENTION

1. Field of the Invention

The present invention relates to an optical amplifier used in a WDM (wavelength division multiplex) transmission system.

2. Description of the Related Art

Recently, along with the development of Internet technology, the amount of information to be transmitted through networks has been rapidly increasing. Therefore, particularly in trunk-line optical transmission systems, both a larger capacity and flexible network formation of transmission lines are required. As one of the most effective methods meeting these requirements, a WDM (wavelength division multiplex) transmission system has been commercialized. The wavelength-division multiplex transmission system is a technology to simultaneously transmitting a plurality of signals through an optical fiber and it can be implemented by multiplexing signal light with a plurality of different wavelengths. In North America and the like, the commercialization of the wavelength-division multiplex transmission system has already been promoted.

For an optical amplifier used in the wavelength-division multiplex transmission system, at present, a rare earth-doped fiber optical amplifier is the most popular in use. The rare earth-doped fiber optical amplifier provides optical amplification by adding a rare earth element to an optical fiber. For example, an erbium-doped fiber optical amplifier (EDFA) is widely known. Since the rare earth-doped fiber optical amplifier has a wide gain band and can collectively amplify multi-wavelength light, the amplifier is widely used as a key component for implementing the wavelength-division multiplex transmission system.

Although conventionally the erbium-doped fiber optical amplifier amplified mainly a band of 1530–1565 nm called a "C-band (conventional band)", recently one for amplifying a band of 1570–1610 nm called an "L-band (long wavelength band)" is being developed. At present, a wavelength-division multiplex transmission system using an erbium-doped fiber optical amplifier can multiplex approximately 200 waves (channels) by using both C-band and L-band together.

In the design of an erbium-doped fiber optical amplifier, an inversion population ratio (or inversion population density) must be appropriately chosen so that the gain of each piece of signal light multiplexed in a wavelength band may be constant. The design method of an erbium-doped fiber optical amplifier is briefly described below.

FIG. 1 shows the wavelength dependence of the gain coefficient of an erbium-doped fiber optical amplifier, where the inversion population ratio of erbium is used as a parameter. The inversion population ratio is the ratio of the number of erbium elements transiting to an excitation state, to the total number of erbium elements added to an optical fiber. The gain coefficient is a gain obtained by a unit length of erbium-doped fiber. Therefore, input light is amplified in an area where a gain coefficient is positive, while the power of input light degrades in an area where the coefficient is negative.

As shown in FIG. 1, the gain of an erbium-doped fiber depends not only on the wavelength, but also on the inversion population ratio. Specifically, the larger the inversion population ratio, the larger the gain. The smaller the inversion population ratio, the smaller the gain. The following is known from the characteristic shown in FIG. 1.

(1) Since in the case of amplifying the C-band collectively, the gain-wavelength characteristic of the signal band must be flat, it is preferable for the inversion population of an erbium-doped fiber to be approximately "0.7". If the inversion population ratio is "0.7", a fairly large gain coefficient can be obtained. Therefore, the erbium-doped fiber optical amplifier for amplifying the C-band can secure a sufficient gain by using a fairly short optical fiber.

(2) Since in the case of amplifying the L-band collectively, the gain-wavelength characteristic of the signal band must be flat, it is preferable for the inversion population of an erbium-doped fiber to be approximately "0.4". If the inversion population ratio is "0.4", the gain coefficient is fairly small. Therefore, in order to make the gain of the L-band equivalent to the gain of the C-band, the fiber length of an erbium-doped fiber optical amplifier for amplifying the L-band must be longer to some degree.

FIG. 2 shows the basic configuration of an erbium-doped fiber optical amplifier for amplifying the L-band. This optical amplifier is often called a gain shift type erbium-doped fiber optical amplifier. The amplifier comprises an erbium-doped fiber 1 as an optical amplification medium, optical isolators 2-1 and 2-2, a wavelength-division multiplexer (ex. WDM coupler) 3 and a pump light source 4. Multi-wavelength light inputted from a transmission line is inputted to the erbium-doped fiber 1 through the optical isolator 2-1 and the WDM coupler 3. Here, pump light generated by the pump light source 4 is supplied to the erbium-doped fiber 1. Therefore, the multi-wavelength light is amplified by the erbium-doped fiber 1. Then, the amplified multi-wavelength light is outputted through the optical isolator 2-2. The configuration of an erbium-doped fiber optical amplifier for amplifying the C-band is basically the same as this amplifier for amplifying the L-band. However, the lengths of the two optical fibers as optical amplification media are different.

In this optical amplifier, the output power of the pump light source 4 is, for example, controlled by a feedback system for maintaining the output power of multi-wavelength light constant. Specifically, a part of multi-wavelength light outputted from the erbium-doped fiber 1 is guided to a control circuit 12 by an optical splitter 11. Then, this control circuit 12 controls the pump light source 4 in such a way that received multi-wavelength light can be maintained at a specific level.

In a wavelength-division multiplex transmission system, a communications channel can be set for each wavelength. Therefore, the configuration of a transmission system can be flexibly modified without installing a new optical fiber or changing the connection between optical fibers. To establish a flexible transport network, an optical communications system for add/drop an optical signal with a specific wavelength in a plurality of multiplex optical signals with a plurality of different wavelengths must be implemented.

However, when one of signal light among a plurality of signal lights in the L-band is turned off, the gain of the erbium-doped fiber optical amplifier for remaining signals varies. Specifically, if signal light on the short wavelength area in the L-band is turned off, the optical power of signal light on the long wavelength area in the L-band outputted from the erbium-doped fiber optical amplifier is lowered compared with that obtained when the signal light on the short wavelength area described above is inputted. In this case, the optical power of the remaining signal light on the long-wavelength area is lowered 10 dB or more, depending on conditions. Therefore, if this phenomenon occurs, there is a possibility that a receiver cannot receive the remaining signal light on the long wavelength area, which is a problem.

It is considered that this phenomenon is due to the fact that signal light on the short wavelength area in the L-band works as the pump light for signal light on the long wavelength area. In the following description, this phenomenon is called "output power changing phenomenon" or "deviation".

The deviation can be theoretically solved by the feed back system shown in FIG. 2. Specifically, when the output optical power of an erbium-doped fiber 1 is lowered, increasing the power of the pump light source 4 by the control circuit 12 compensates for the deviation. However, in order to compensate for the deviation, a feedback system with a response speed in units of micro-seconds must be prepared, the implementation of which is difficult. Even if such a feedback system can be implemented, the stability of a control system would be a problem. Since this method aims to compensate for the deviation caused in an optical amplification medium by pump light feedback control, this cannot be a fundamental solution from the viewpoint of the optical static characteristic of an erbium-doped fiber optical amplifier. Specifically, this method cannot avoid deviation itself.

In order to avoid the deviation, there is, for example, a configuration to shorten the fiber length of an erbium-doped fiber optical amplifier. However, if the fiber length is shortened, as described with reference to FIG. 1, a sufficient gain cannot be obtained. In order to obtain a sufficient gain with a short fiber, higher inversion population ratio is required. However, a gain varies depending on a wavelength in a case where the inversion population ratio is changed, each signal multiplexed in the multi-wavelength light cannot be amplified by a same gain.

As another solution, there is a configuration in which a plurality of short erbium-doped fibers are connected in series. However, since in this configuration, the pump light source must be prepared for each erbium-doped fiber, it is difficult to implement the miniaturization and low cost of an optical amplifier.

This problem can occur not only in an erbium-doped fiber optical amplifier, but also in optical amplifiers in other forms.

SUMMARY OF THE INVENTION

It is an object of the present invention to prevent the output power of the remaining light from being lowered even if a part of multi-wavelength light is turned off in an optical amplifier for amplifying multi-wavelength light.

The optical amplifier of the present invention comprises an optical fiber used as an optical amplification medium amplifying multi-wavelength light, and a pump light source supplying the optical fiber with pump light. The minimum distance that the pump light can be propagated in the optical fiber is determined in such a way that a lowered power of second light in the multi-wavelength light outputted from the optical fiber, when a transition from a state where first light in the multi-wavelength light is input in the optical fiber into a state where the first light is not substantially input in the optical fiber is occurred, may not exceed a predetermined threshold.

In the optical amplifier, a distance that the pump light can be propagated (effective length) exceeds the threshold, the optical fiber can sufficiently absorb the energy of the pump light. Therefore, the multi-wavelength light can receive sufficient energy from the pump light. Specifically, there is no need to transfer energy between the first light and second light in the multi-wavelength light. Therefore, even if the first light is turned off, the output power of the second light varies (generally, lowered) slightly.

The pump light source can be designed to output pump light with a wavelength such that a distance that the pump light can be propagated in the optical fiber exceeds the minimum distance.

The optical amplifier in another feature of the present invention comprises the optical fiber and pump light source described above, and a minimum inversion population ratio at the output end of the optical fiber is determined in such a way that a lowered power of second light in the multi-wavelength light outputted from the optical fiber, when a transition from a state where first light in the multi-wavelength light is input in the optical fiber into a state where the first light is not substantially input in the optical fiber is occurred, may not exceed a predetermined threshold. In this configuration too, the output power of the second light varies (generally, it lowered) slightly by the same function even if the first light is turned off.

BRIEF DESCRIPTION OF THE DRAWINGS

FIG. 1 shows the wavelength dependence of the gain coefficient of an erbium-doped fiber;

FIG. 12 shows the relationship between a deviation and inversion population ratio;

FIG. 19A shows an optical amplifier using the remaining pump light for Raman amplification;

FIGS. 19B and 19C show the loss characteristic of a demultiplexer;

DESCRIPTION OF THE PREFERRED EMBODIMENTS

Contents of Ser. No. 09/949,873 and an application in Japan 2000-382711 (which was filed in United States on Dec. 13, 2001, but serial number was not assigned yet) are hereby incorporated by reference.

The embodiments of the present invention are described with reference to the drawings. In the following description, an erbium-doped fiber optical amplifier is mainly described as an optical amplifier for amplifying multi-wavelength light in the L-band. An erbium-doped fiber, which is an optical fiber with erbium added, may be called an "EDF". An erbium-doped fiber optical amplifier may be called an "EDFA (EDF amplifier)".

First, the characteristics of an erbium-doped fiber optical amplifier and the cause of a deviation caused in the prior art are studied.

An optical amplifier for amplifying multi-wavelength light is generally designed to meet the following two conditions.

(1) A necessary gain can be obtained.

(2) A gain is flat throughout the entire band in which multi-wavelength light is located.

Therefore, in the design of an erbium-doped fiber optical amplifier for amplifying the L-band, the average inversion population ratio of an erbium-doped fiber is set to approximately "0.4" in order to meet the condition (2). The inversion population ratio can be controlled, for example, by controlling the optical power of pump light. The length of the erbium-doped fiber is set to a length such that the condition (1) is satisfied in a state where the average inversion population ratio is made to be approximately "0.4".

Figure 3:
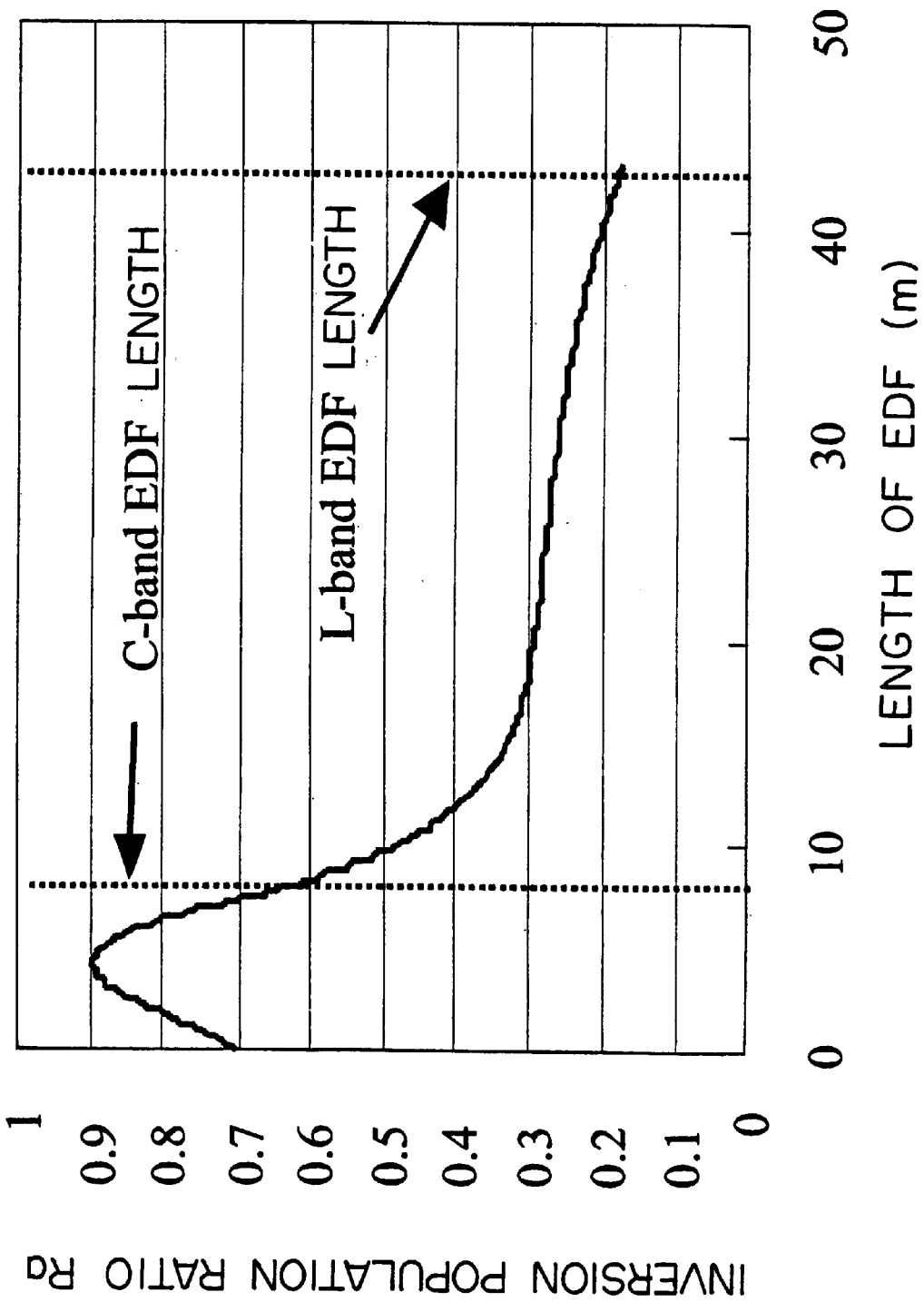
FIG. 3 shows the inversion population ratio of an erbium-doped fiber.

FIG. 3 shows the inversion population ration of an erbium-doped fiber. This inversion population ratio is obtained by simulation where pump light with a prescribed optical power is supplied to an erbium-doped fiber by forward-direction pumping.

The inversion population ratio is high near the input end of pump light. Specifically, in a region up to approximately 10 m from the input end, the inversion population ratio is approximately "0.5" to "0.9". However, the larger a distance from the input end of pump light, the larger the attenuation of pump light and the smaller the inversion population ratio, accordingly. In the example shown in FIG. 3, in a position 40m apart from the input end, the inversion population ratio is approximately "0.2".

The following is concluded from FIGS. 3 and 1. (1) In the case where the C-band is amplified, the average inversion population ratio must be approximately "0.7". Therefore, in the example shown in FIG. 3, the length of an erbium-doped fiber becomes approximately 10 meters. Here, in an erbium-doped fiber optical amplifier for amplifying the C-band, the inversion population ratio is high throughout the entire erbium-doped fiber. Specifically, at the output end of the erbium-doped fiber too, pump light power is sufficiently high. (2) In the case where the L-band is amplified, the average inversion population ratio must be approximately "0.4". Therefore, in the example shown in FIG. 3, the length of an erbium-doped fiber becomes approximately 40 to 50 meters. Here, in an erbium-doped fiber optical amplifier for amplifying the L-band, the inversion population ratio is low near the output end of the erbium-doped fiber. That is to say, sufficient pump light is not supplied up to near the output end of the erbium-doped fiber.

Figure 4:
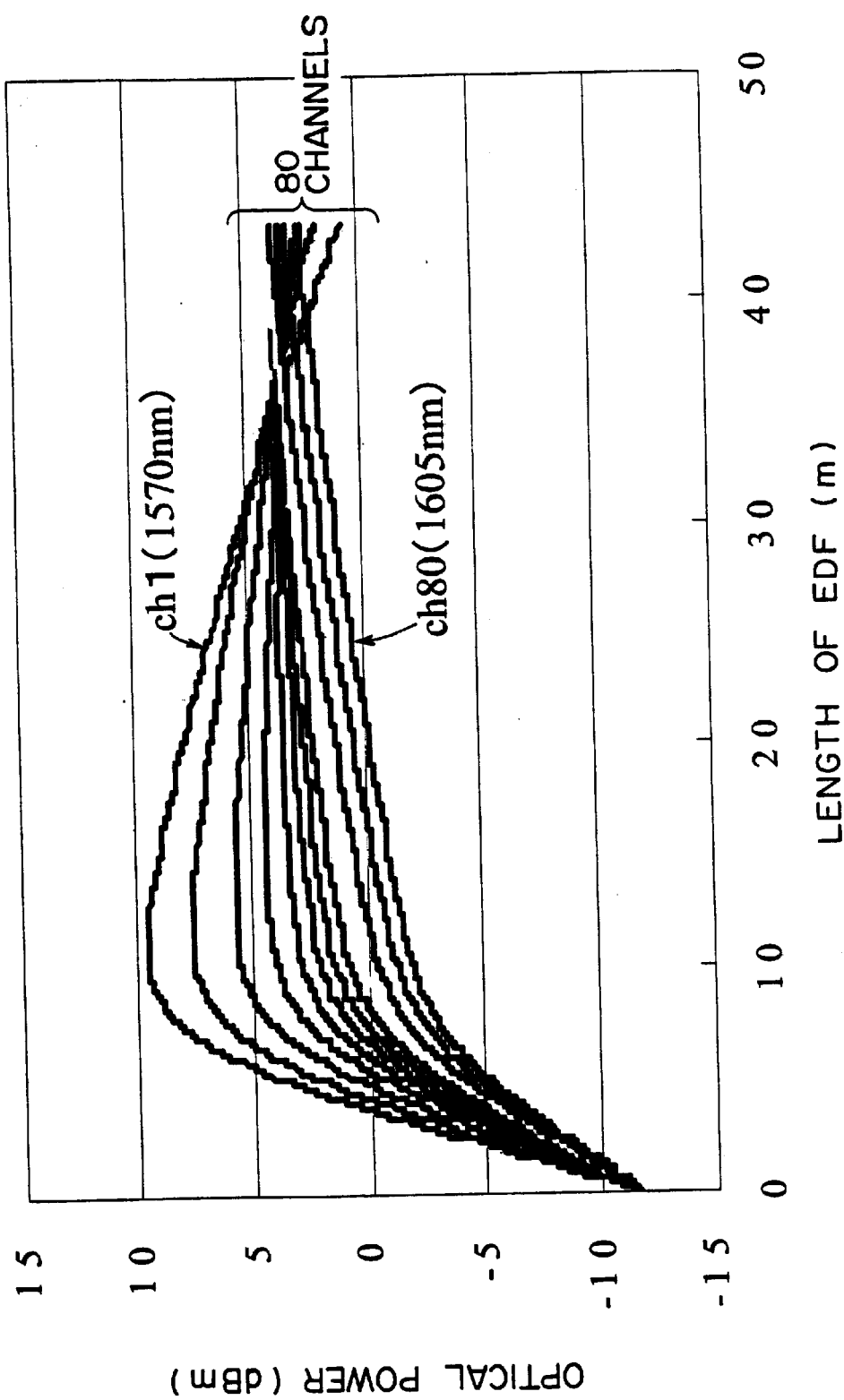
FIG. 4 shows the optical power distribution of multi-wavelength light located in the L-band.

FIG. 4 shows the optical power distribution of multi-wavelength light located in the L-band. In FIG. 4, 80 waves are multiplexed in a band of 1570 to 1605 nm at intervals of approximately 4 nm. However, in FIG. 4, only eleven waves, selected from 80 waves and at almost equal intervals, are shown for the purpose of making the drawing easy to understand.

A plurality of input optical powers of each wavelength are equal. Each of 80 waves located in a band of 1570 to 1605 nm is used as signal light, and communications channels using these pieces of signal light are called "ch1" through "ch80".

As shown in FIG. 4, the optical power distribution of each piece of signal light greatly depends on the wavelength. Specifically, light on the short wavelength area (near 1570 nm) is rapidly amplified near the input end of the erbium-doped fiber and the optical power reaches the peak value, then the optical power is gradually lowered up to the output end. However, the optical power of light on the long wavelength area (near 1605 nm) monotonically increases from the input end of the erbium-doped fiber up to the output end.

With reference to the characteristics shown in FIGS. 3 and 4, it is found that the wavelength characteristic of a gain in an erbium-doped fiber depends on the inversion population ratio. Specifically, in an area with a high inversion population ratio (for example, a region up to 10 meters from the input end of pump light), all the waves (ch1 to ch80) located in the L-band are amplified. However, in a area where the inversion population ratio is small, the optical power of light on the short wavelength area in the L-band is lowered although light on the long wavelength area is amplified. From this fact it can be judged that in a area with a low inversion population ratio, light on the short wavelength area in the L-band works as the pump light for light on the long wavelength area. Specifically, it is presumed that in an area with a low inversion population ratio, the energy of pump light is not sufficient and a part of the energy of light on the short wavelength area in the L-band is absorbed by light on the long wavelength area.

Therefore, if the optical power of pump light is constant, the optical power of signal light on the long wavelength area in the case where there is signal light on the short wavelength area is higher than that in the case where there is no signal light on the short wavelength area. Specifically, for example, if signal light (for example, ch1) on the short wavelength area in the L-band is turned off while multi-wavelength light located in the L-band is amplified using an erbium-doped fiber optical amplifier, the optical power of the remaining signal light on the long wavelength area is lowered. This phenomenon is called a "deviation".

Figure 2:
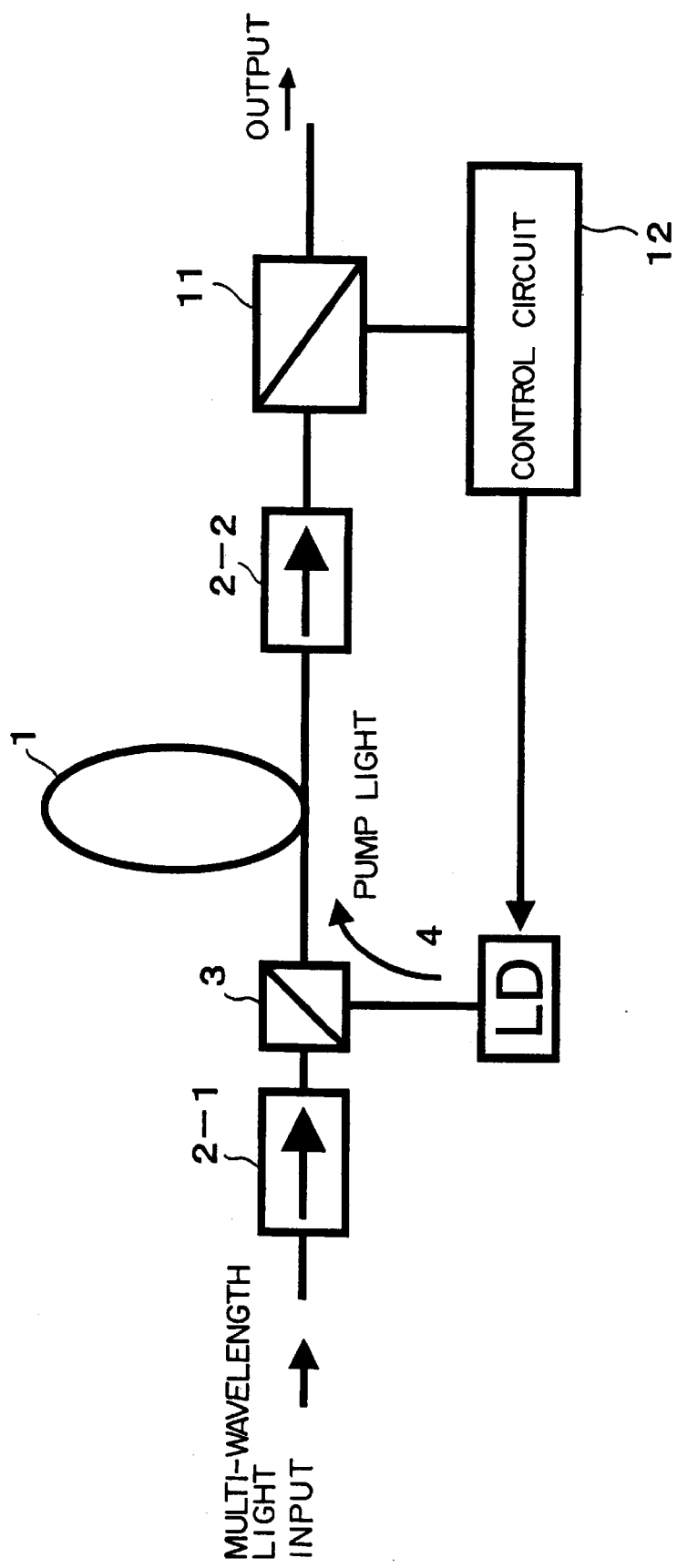
FIG. 2 shows the basic configuration of an EDFA for amplifying the L-band.
Figure 5:
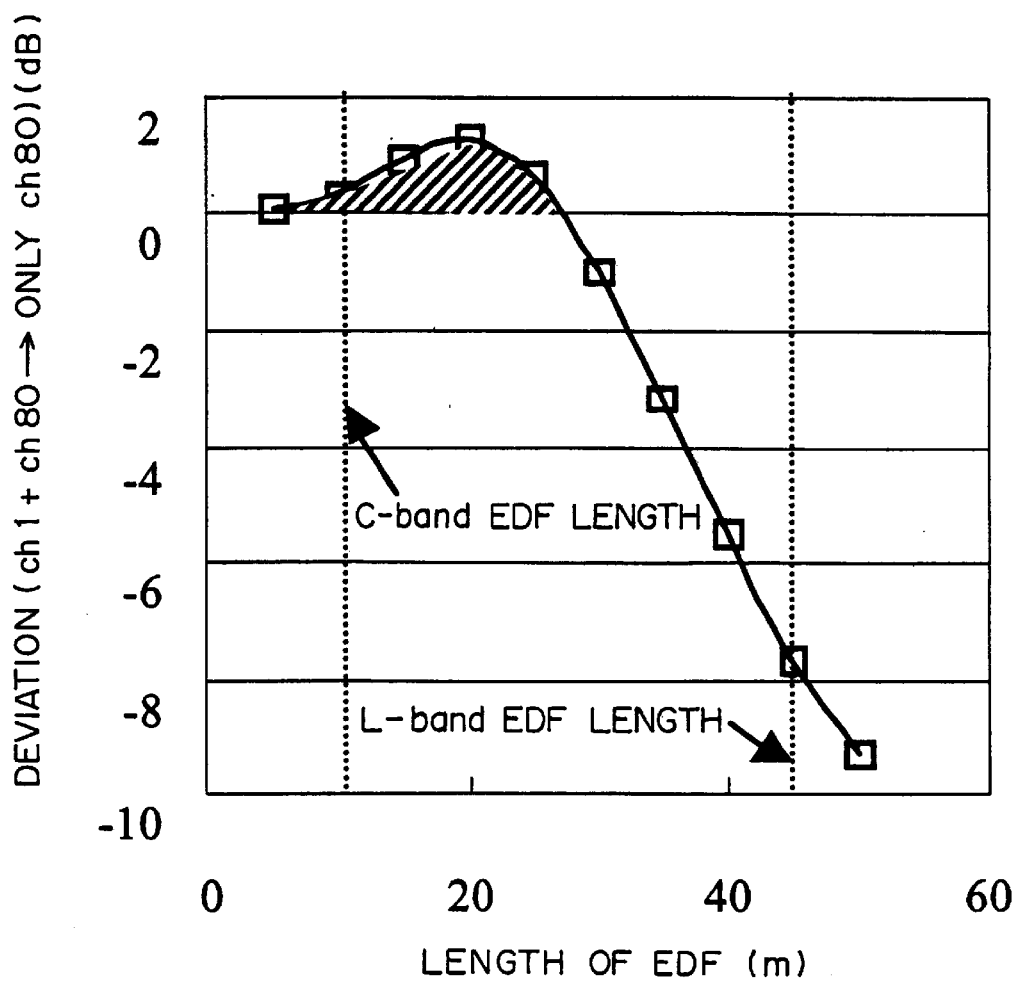
FIG. 5 shows the EDF length dependence of a deviation.

FIG. 5 shows the EDF length dependence of a deviation. In FIG. 5, the deviation of an optical power, when a transition is occurred from a state where both signal light of ch1 and signal light of ch80 are input into a state where only signal light of ch80 is input in the erbium-doped fiber optical amplifier of FIG. 2, is shown.

The deviation does not occur if an erbium-doped fiber is short. In the example shown in FIG. 5, if the fiber length is up to 20 meters, there is substantially no deviation. However, if the fiber length exceeds a prescribed value, the deviation occurs.

This fact can be explained by using the optical power of pump light or inversion population ratio. That is to say, if an erbium-doped fiber is long, sufficient pump light is not supplied near the output end, and the inversion population ratio is low, accordingly. Therefore, near the output end of the erbium-doped fiber, signal light on the long wavelength area cannot absorb sufficient energy from the pump light and receives energy from signal light on the short wavelength area. As a result, if an erbium-doped fiber is long, the optical power of signal light on the long wavelength area is lowered when the signal light on the short wavelength area is turned off.

Figure 6:
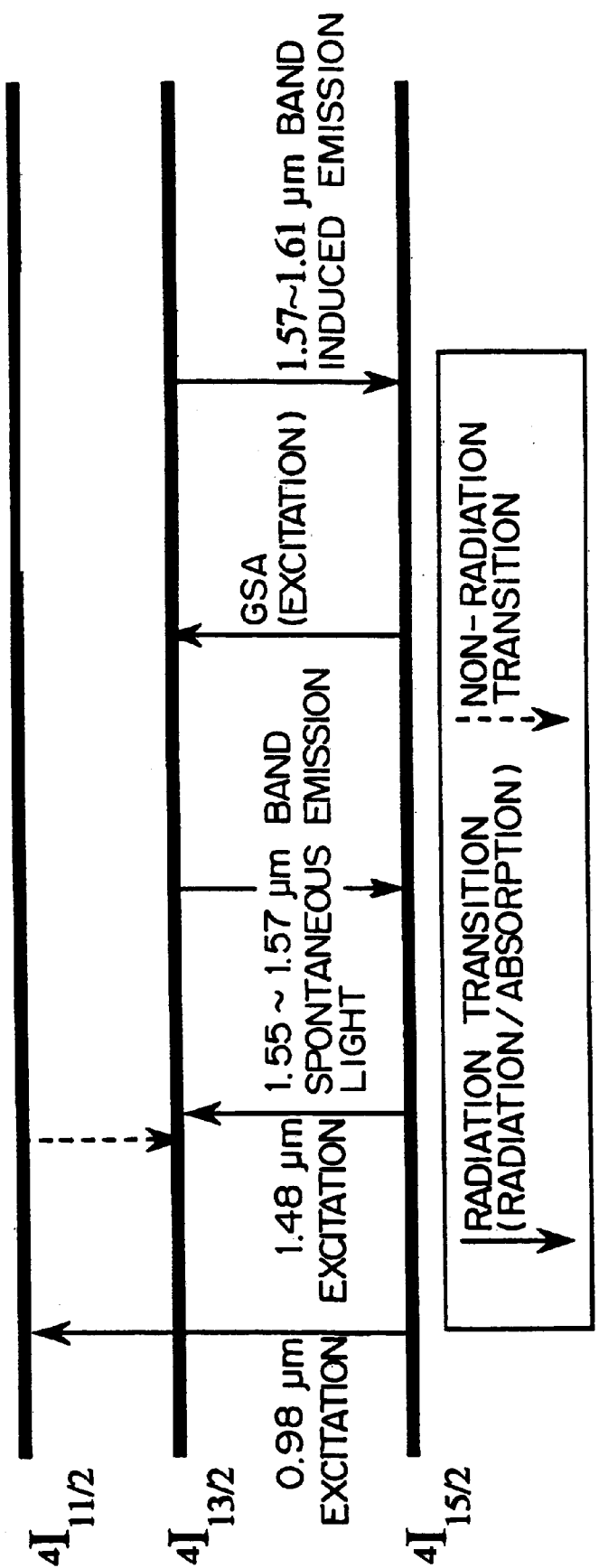
FIG. 6 shows the energy level of an erbium ion and the transition.

FIG. 6 shows the energy level of an erbium ion and its transition. In this example, pump light of 0.98 $\mu$m, pump light of 1.48 $\mu$m and multi-wavelength light in the L-band are assumed to be inputted to an erbium-doped fiber.

An erbium ion is transits from state I (15/2) to state I (11/2) by the pump light of 0.98 $\mu$m and is transited from state I (15/2) to state I (13/2) by the pump light of 1.48 $\mu$m. If the ion transits from state I (13/2) to state I (15/2), spontaneous emission light (ASE) is generated in a band of 1.55–1.57 $\mu$m. In addition, state I (15/2) is transited to state I (13/2) by ground state absorption (GSA). This ground state absorption includes a phenomenon that an erbium ion absorbs a part of the energy of signal light on the short wavelength area in the L-band. Specifically, if the optical power of pump light is not sufficient, an erbium ion sometimes absorbs a part of the energy of signal light on the short wavelength area in the L-band. Then, if the erbium ion transits from state I (13/2) to state I (15/2), induced emission is caused in induction light in a band of 1.55 to 1.61 $\mu$m (signal light located in the L-band) and the L-band is amplified.

As shown in FIG. 1, if the inversion population ration is less than 0.3, the gain coefficient of the L-band becomes negative. This phenomenon means that in FIG. 6, GSA is larger than induced emission. Here, as shown in FIG. 3, the inversion population ratio is less than 0.3 near the output end of an erbium-doped fiber (a region 20 meters or more apart from the input end) Therefore, from this fact it can be judged that near the output end of an erbium-doped fiber, the GSA of signal light on the short wavelength area in the L-band amplifies signal light on the long wavelength area.

Figure 7:
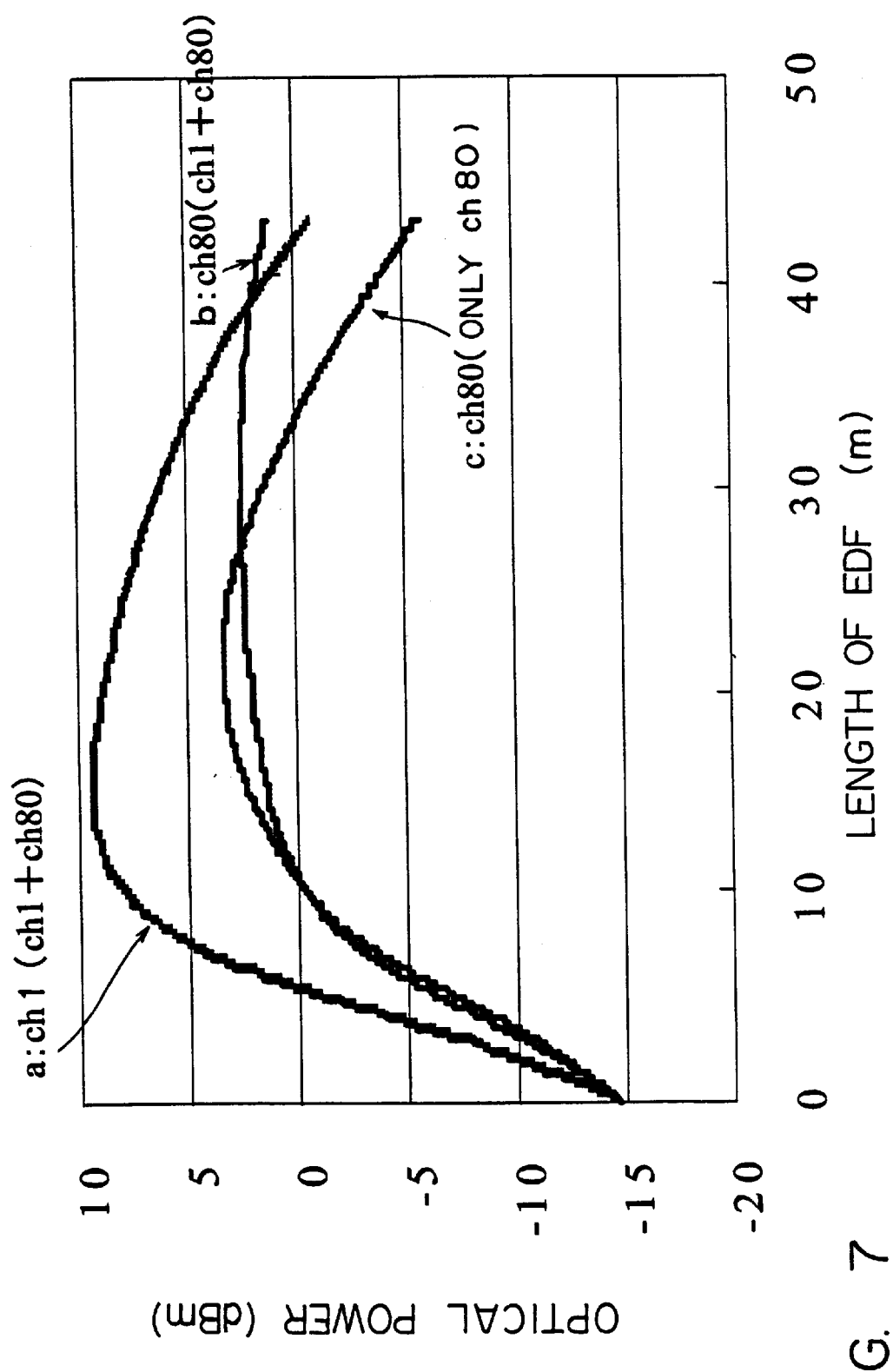
FIG. 7 shows the pumping effect by signal light on the short wavelength area.

FIG. 7 shows the pumping effect by signal light on the short wavelength area. In this example, it is assumed that ch1 and ch80 shown in FIG. 4 are used. Characteristics "a" indicates the optical power of ch1 obtained when both ch1 and ch80 are input in an erbium-doped fiber. Characteristics "b" indicates the optical power of ch80 obtained when both ch1 and ch80 are input in the erbium-doped fiber. Characteristics "c" indicates the optical power of ch80 obtained when only ch80 is input in the erbium-doped fiber. In this case, the optical power of pump light is constant.

When characteristics "b" and "c" are compared, it is found that the signal light of ch80 is pumped by the signal light of ch1. Specifically, when the signal light of ch1 is turned off, the optical power of the signal light of ch80 is greatly attenuated near the output end of an erbium-doped fiber, and when the signal light of ch1 is input, such attenuation cannot be detected. This means that the signal light of ch80 is amplified by the GSA of the signal light of ch1.

As described above, in a system for amplifying multi-wavelength light in the L-band using an erbium-doped fiber optical amplifier, if signal light on the short wavelength area is turned off for some reason, the output power of signal light on the long wavelength area is lowered. Even if the optical amplifier is provided with an ALC (Auto Level Control) circuit or an AGC (Auto Gain Control) circuit, it is difficult to avoid temporary deviation. Therefore, according to the conventional system, there was a possibility that a receiver for receiving multi-wavelength light from this optical amplifier cannot receive signal light on the long wavelength area and receiving error may occur.

This phenomenon is caused not only in an erbium-doped fiber optical amplifier, but also in other rare earth-doped optical fiber amplifiers performing a three-level transition if the amplifier is configured in such a way that the fiber length as an optical amplification medium will be made long by setting a low average inversion population ratio. For example, the same deviation also occurs in a thulium (Tm)-doped fluoride fiber optical amplifier performing a pseudo three-level transition.

The optical amplifier of the present invention is designed taking into consideration the characteristic of a rare earth-doped fiber in such a way that the deviation described above may not occur. Specifically, for the threshold values of parameters to be used in the design of an optical amplifier such that such a deviation cannot occur, the effective length of pump light in a rare earth-doped fiber, the wavelength of pump light to be supplied to a rare earth-doped fiber, the inversion population ratio at the output end of a rare earth-doped fiber and the like are used.

Next, the specific embodiments (simulation results) of the present invention are shown. The conditions of the simulations are as follows.

(1) Channel in Use
  Among ch1 through ch80 shown in FIG. 4, ch1 (1570.41 nm) and ch33 (1583.69 nm) are used.
(2) Definition of a Deviation
  A deviation is a value obtained by subtracting the optical power level of ch33 in the case where both the signal light of ch1 and the signal light of ch33 are input, from the optical power level of ch33 in the case where only the signal light of ch33 is input. Therefore, if this value is positive, it indicates that output power of ch33 is not lowered (no deviation) If this value is negative, it indicates that output power of ch33 is lowered, and the larger the absolute value of it, the more the optical power of ch33 is lowered (deviation is large).
(3) Erbium-Doped Fiber Optical Amplifier
  (a) Optical amplification medium: Erbium-doped silica optical fiber
  (b) Pumping method: One-stage forward-direction pumping
  (c) Wavelength of pump light: Varies in the range of 0.98 to 1.46 $\mu$m (d) Input level of each channel: Varies in the range of −14.3 to −21.3 dBm/ch (e) Gain of optical amplifier: Varies in the range of 16.1 to 29.1 dB (f) Control method: AGC (Auto Gain Control)

Note: In an AGC system, if the input optical level of signal light changes, the output power also changes correspondingly. Although FIG. 2 shows a feedback system for ALC, AGC system can be established by controlling the pump light source based on both the input optical power and output optical power of an optical amplifier.

(g) EDF length: This is the length of an erbium-doped fiber used as an optical amplification medium. The EDF length is optimized in such a way that the gains of the signal light of ch1 and signal light of ch33 can be made equal or almost equal when both the signal light of ch1 and signal light of ch33 are inputted. If the pump light wavelength or the input level of signal level varies, the EDF length may change accordingly.

The relationship between the effective length of pump light and a deviation has been simulated under the conditions described above. The "effective length of pump light" is a distance that the pump light can be propagated in an erbium-doped fiber. In this example, this length is defined as a distance between the input end of an erbium-doped fiber and a position where the optical power of the pump light attenuates to 1/e (approximately 0.368) of the optical power of it at the input end.

The reason why the relationship between the effective length of pump light and a deviation has been checked is as follows. As described above, a deviation is due to the fact that sufficient pump light is not supplied up to near the output end of an erbium-doped fiber. It is estimated that whether a deviation occurs or not has a close relationship to a distance up to which sufficient pump light is supplied in an erbium-doped fiber (that is, the effective length of pump light). Therefore, it is judged that the effective length of pump light is useful as a parameter for designing an optical amplifier without a deviation.

The following three methods can be used to adjust the effective length of pump light.

(1) To modify the wavelength of pump light.
(2) To modify excitation density.
(3) To change an optical amplification medium.

First, the simulation results obtained when the effective length of pump light is adjusted by modifying the wavelength of pump light are shown.

Figures 8A, 8B:
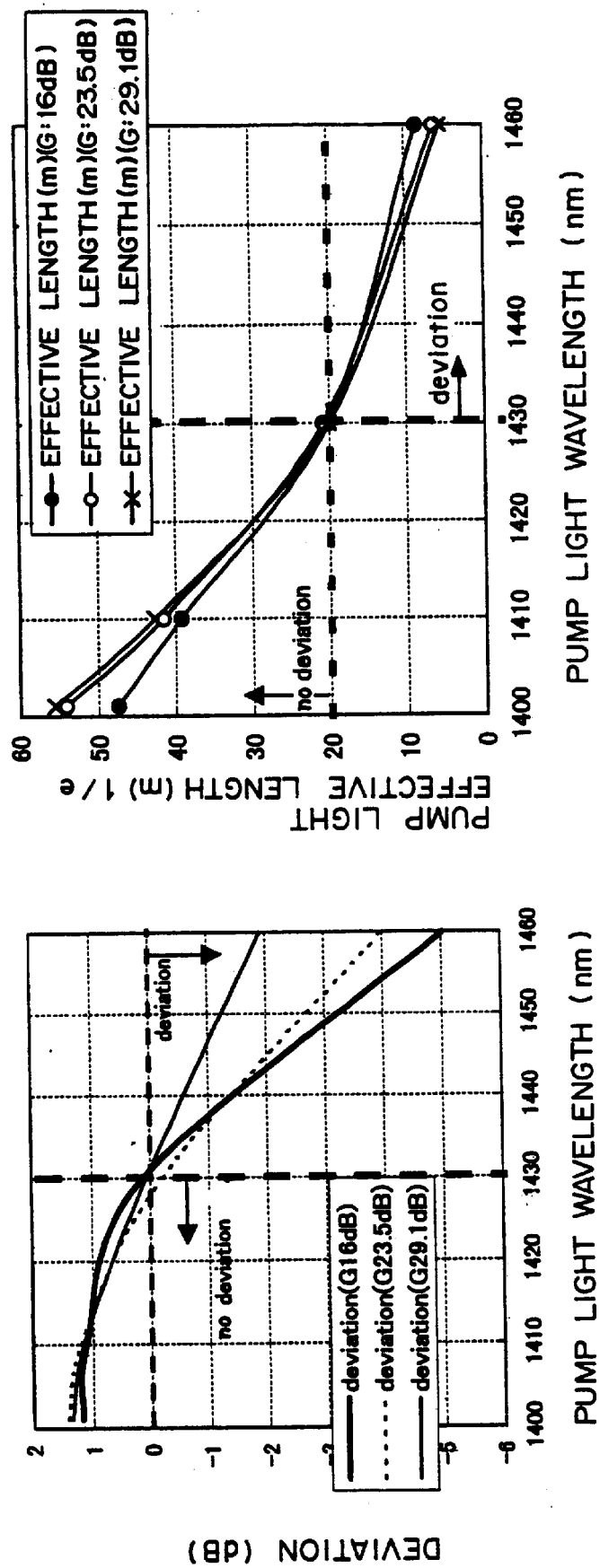
FIG. 8A shows a deviation obtained when the wavelength of pump light is changed.
FIG. 8B shows the relationship between the wavelength of pump light and its effective length.
Figure 9:
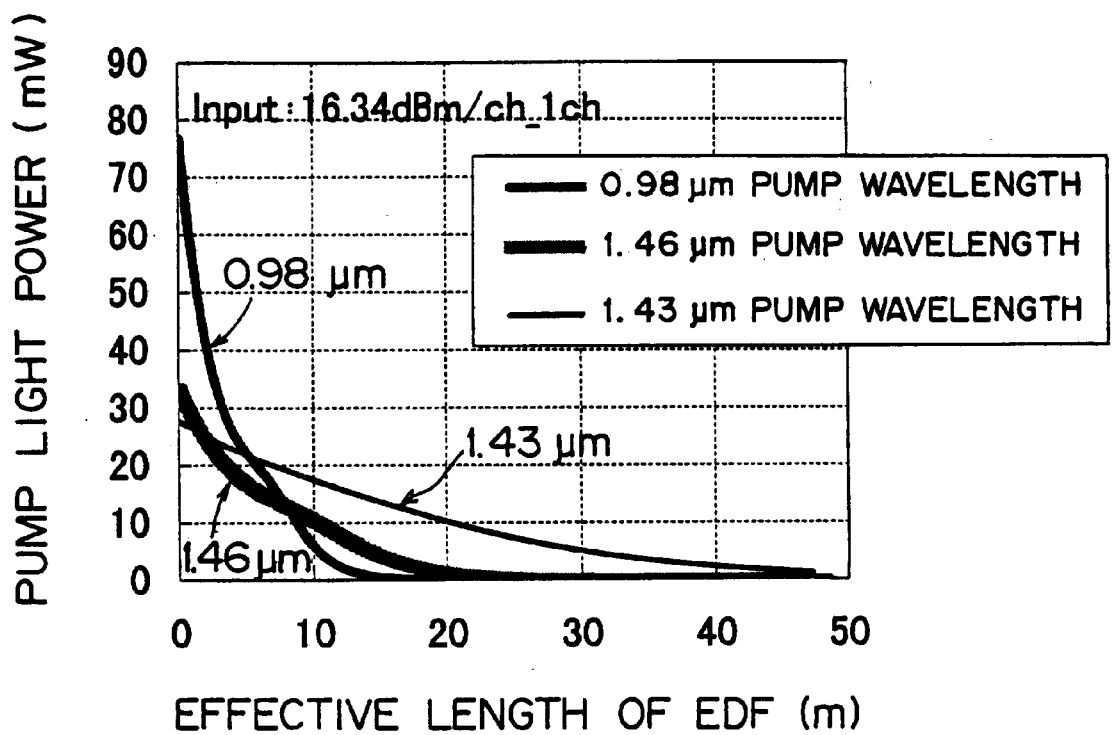
FIG. 9 shows the attenuation characteristic of pump light in an erbium-doped fiber.

FIG. 8A shows the deviation obtained by changing the wavelength of pump light. FIG. 8B shows the relationship between the wavelength of pump light and the effective length of it. Furthermore, FIG. 9 shows the attenuation characteristic of pump light in an erbium-doped fiber. In the simulations shown in FIGS. 8A and 8B, three pieces of data obtained when the gain of an optical amplifier is changed (16 dB, 23.5 dB and 29.1 dB) are shown.

As shown in FIG. 8A, when the pump light wavelength is approximately 1430 nm, the deviation becomes zero. When the pump light wavelength is in the range of 1400 to 1430 nm, this deviation is positive. In other words, output power is not lowered. In this wavelength range, the shorter the pump light wavelength, the grater the deviation in positive direction. However, the value saturates at approximately 1 dB. Therefore, even if the signal light of ch1 is turned off, the optical power of the signal light of ch33 varies slightly, which is an insignificant problem.

If the pump light wavelength is longer than 1430 nm, the deviation becomes negative. In other words, output power is lowered. In this case and in this wavelength range, the longer the pump light wavelength becomes, the rapidly greater the absolute value of the deviation becomes. In particular, if the gain of an optical amplifier is small, the absolute value of the deviation becomes fairly large. Therefore, if the pump light wavelength is longer than 1460 nm, the optical power of the signal light of ch33 is greatly lowered when the signal light of ch1 is turned off.

The power distribution of pump light in the longitudinal direction from the input end of an EDF has a strong characteristic depending on the pump light wavelength. A case where the input conditions and output conditions of signal light are the same is described below using 0.98 μm and 1.46 μm as pump light wavelengths, which are the common pump light wavelengths of an EDF. Since the gain efficiency (gain/EDF length/pump light power) of pump light of 0.98 μm is higher than that of 1.46 μm, when pump light of 0.98 μm is used, the optical power of signal light sharply increases reaches the peak at near input end of an EDF, and rapidly attenuates in the longitudinal direction of the EDF. In this case, since the pump light of 0.98 μm is rapidly absorbed, it attenuates sharply naer input end of the EDF.

Therefore, in an EDF for the L-band where a long EDF length must be used, pump light cannot be propagated to output end of the EDF depending on the pump light wavelength. This situation is described with reference to FIG. 9 (the power distribution of pump light in the longitudinal direction from the input end of an EDF). Here, wavelength of pump light is shorter than 1.48 μm, which is the common pump light wavelength of an EDF. As shown in FIG. 9, pump light is propagated further in the EDF in the order of 1.43 μm, 1.46 μm and 0.98 μm. Specifically, the effective EDF length of pump light is lengthened.

FIG. 8B shows the EDF pump light effective length of shorter wave length pump light(1.40–1.46 μm), compared with conventional common pump light wavelength (1.48 μm). Here, "pump light effective length" is defined as a distance between the input end of the EDF and a position where the optical power of the pump light attenuates to 1/e (approximately 0.368) of initial pump light power at the input end. The pump light effective length is substantially determined based on corresponding pump light wavelength in the wide gain range and wide input range of a general optical amplifier. For example, the pump light effective lengths obtained when pump light wavelengths are 1.46 μm, 1.43 μm and 1.40 μm are approximately 7 m, 20 m and 50 m, respectively. However, specifically, since the inversion population ratio varies depending on the gain, the pump light effective length has gain dependence (FIG. 8B). Therefore, in the detailed design, attention must be paid to the gain dependence of pump light effective length. For example, in the gain range of 16 dB to 29 dB, if the pump light wavelength is 1.43 μm, the pump light effective length is almost constant, however if the pump light wavelength is 1.40 μm and 1.46 μm, the pump light effective lengths have errors of approximately 10 m and 5 m, respectively.

The pump light effective length also has some degree of input dependence. Since a inversion population ratio near the signal input end of the EDF varies depending on the input power, the higher the gain efficiency of the pump light wavelength, the shorter the effective length. Therefore, the pump light effective length is influenced by the input power. That is to say, the higher is the input power, the smaller is the inversion population near the input end of an EDF, and the effective length tends to lengthen. For example, in the range of −36.34 dBm to +6.1 dBm, if the pump light wavelength is 1.40 μm, the pump light effective length is almost constant, however, if they are 1.43 μm and 1.46 μm, the errors become approximately 1 m and 6 m, respectively. Like this, the input dependence becomes great depending on gain efficiency. Therefore, if the pump light wavelength with high gain efficiency is used and an input power is overly high, attention must be paid to input dependence to determine the pump light effective length.

Taking these facts into consideration, it is found that if the effective length of pump light is designed to be longer than a prescribed value in an erbium-doped fiber optical amplifier for amplifying the L-band, an optical amplifier without a deviation can be implemented. In the example described above, if the effective length of pump light is designed to be longer than 20 meters, the deviation can be avoided. In order to obtain pump light effective length of 20 meters or more, the pump light wavelength should be 1430 nm or less. However, taking into consideration a noise characteristic, which is described later, it is preferable that the pump light wavelength should be 1400 nm or more. This design method is applicable to a wide operation range (the gain of an optical amplifier and the input power of pump light).

For the pump light wavelength of an erbium-doped fiber optical amplifier for amplifying the L-band, 0.98 μm and 1.48 μm bands have mainly been used. Since these wavelength bands have no excited state absorption (phenomenon in which an excited electron is further excited to a higher level by pump light) and can obtain a high gain, commercialization has been promoted. For the pump light source of the 1.48 μm band, a semiconductor laser with a range of 1460 to 1490 nm has been developed. In other words, conventionally, for the pump light wavelength, a range of 1400 to 1460 nm was not used.

The reason why a range of 1460 to 1490 nm has been used for the pump light wavelength is mainly due to the small noise. Since conventionally, a deviation, which the present invention tries to solve, has not been recognized, there was no problem in using a range of 1460 to 1490 nm as the pump light wavelength. In other words, conventionally there was no need to use a wavelength other than 1460 to 1490 nmm as the pump light wavelength.

However, the optical amplifier in the embodiment uses pump light with a wavelength shorter than that in a range of 1460 nm to suppress a deviation occurring when the L-band is amplified. In particular, by using pump light with a wavelength in a range of 1400 to 1430 nm, the deviation can be avoided.

Although as other methods for adjusting the effective length of pump light, there are a method for modifying the excitation density of an optical amplification medium and a method for changing the material of an optical amplification medium, as described above, the basic design policy is the same in any method. These methods are briefly described below.

The excitation density is a parameter closely related to the gain efficiency. That is, the smaller the excitation density, the lower the gain efficiency. Here, the lower the gain efficiency, the longer the effective length of pump light. Therefore, by suppressing the excitation density of an erbium-doped fiber below a prescribed value, the effective length of pump light can be longer than the prescribed value.

It is generally known that narrowing the overlapping of signal light and pump light in an optical amplification medium can reduce the excitation density. As a method for narrowing the overlapping of signal light and pump light in an optical amplification medium, for example, a structure for introducing a low NA core or a large-diameter core into an optical amplification medium, the wide-range doping of an optical amplification medium or the like are suitable. Since according to these structures, a rare earth ion can be prevented from centering in an area with high-excitation optical strength, and the excitation density can be reduced.

By modifying the ratio between a mode field diameter and a rare earth-doping diameter, which are the general parameters of a rare earth-doped optical amplification medium, the effective length of pump light can also be lengthened and a deviation can also be prevented accordingly.

As the host glass of an optical amplification medium, not only a silica type, but also a fluoride type, a telluride type, a bismuth type, a phosphoric acid type and a silicate type and the like are known. Therefore, by appropriately selecting the material of host glass, the effective length of pump light can be adjusted.

Although three methods are introduced as means for independently adjusting the effective length of pump light, these methods can be combined. For example, both the pump light wavelength and excitation density can also be adjusted in order to obtain a prescribed effective length of pump light.

If a deviation is avoided by making the effective length of pump light longer than a prescribed value, there is a possibility that the noise characteristic and gain efficiency may become problems. Therefore, those values must be taken into consideration Next, the relationship between the pump light wavelength and a noise is described.

When an erbium-doped fiber optical amplifier is used in an optical communications system, generally it is preferable that the amplifier has a high saturation output and a low noise (low noise figure NF). Compared with 0.98 μm-band pumping, 1.48 μm-band pumping has a larger saturation output and a larger noise. Specifically, in the cases of 0.98 μm-band pumping, the noise figure is approximately 3 dB, however, in the cases of 1.48 μm-band pumping, the noise figure is approximately 5 dB. It is generally known that the closer the difference between an excitation level and a higher level, the larger the noise figure.

In the embodiment, in order to suppress a deviation, the pump light with shorter wavelength than 1460 nm is used. However, if the pump light with the wavelength in this wavelength range is used, the noise figure degrades compared with using the pump light with the wavelength in a range of 1460 to 1490 nm.

Figure 10:
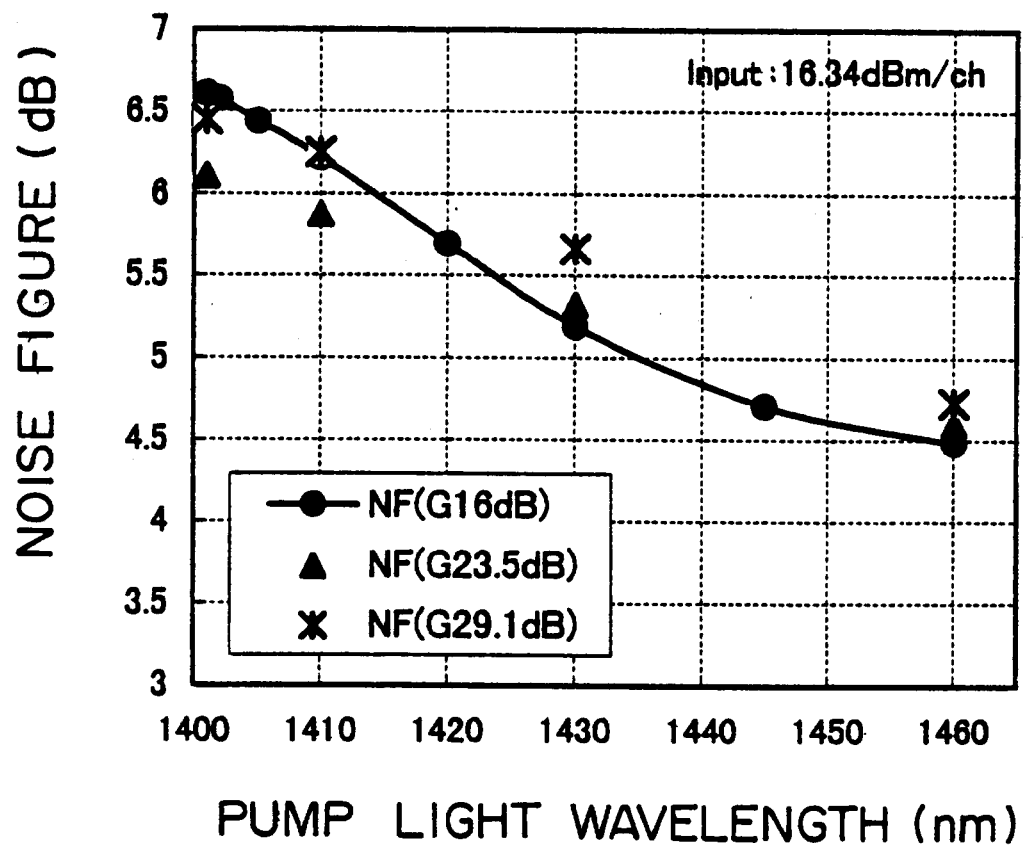
FIG. 10 shows the relationship between the pump light wavelength and a noise figure.

FIG. 10 shows the relationship between the pump light wavelength and a noise figure. Here, the simulation result of the noise figure NF of ch1 obtained when both the signal light of ch1 and the signal light of ch33 are input. Results obtained when the gain of an optical amplifier is changed are also shown. In this example, the case where the input power of each piece of signal light is 16.34 dBm is shown. However, even if the input power of signal light is changed, the relationship between the pump light wavelength and noise figure is almost the same.

As shown in FIG. 10, in a wavelength range of 1400 to 1460 nm, the shorter the pump light wavelength, the greater the noise figure. In this example, in a case where the pump light wavelength is 1400 nm, the noise figure degrades approximately 2 dB more compared with a case where the pump light wavelength is 1460 nm. The degradation of the noise figure of an optical amplifier greatly affects the transmission characteristic of an optical communications system. If the noise figure degrades 2 dB or more, it is difficult to use the optical amplifier in a communication system. Therefore, it is preferable that the pump light wavelength is longer than 1400 nm.

As described above, the change of the pump light wavelength greatly affects the deviation and a noise figure. Therefore, in the design of an erbium-doped fiber optical amplifier, the trade-off between the suppression of the deviation and the degradation of a noise figure must be taken into consideration. The guidelines on designing an erbium-doped fiber optical amplifier are described below.

As shown in FIG. 8B, the deviation can be prevented from occurring by making the effective length of pump light 20 to 60 meters. As shown in FIG. 8A, this condition can be satisfied by making the pump light wavelength 1400 to 1430 nm. However, if the pump light within this range is used, the noise figure degrades at a maximum of approximately 2 dB compared with that obtained when a general pump light wavelength in the 1.48 $\mu$m band (1460 to 1490 nm) is used. Therefore, care must be taken.

As shown in FIG. 8B, if the effective length of pump light is 5 to 20 meters, the noise figure can be minimized while suppressing the deviation. As shown in FIG. 8A, this condition can be satisfied by making the pump light wavelength 1430 to 1460 nm. If an optical amplifier is designed under this condition, a better noise figure can be obtained than that obtained when the pump light wavelength of 1400 to 1430 nm is used, and the deviation can be more greatly suppressed than that obtained when a general pump light wavelength in the 1.48 $\mu$m band is used.

Figure 11:
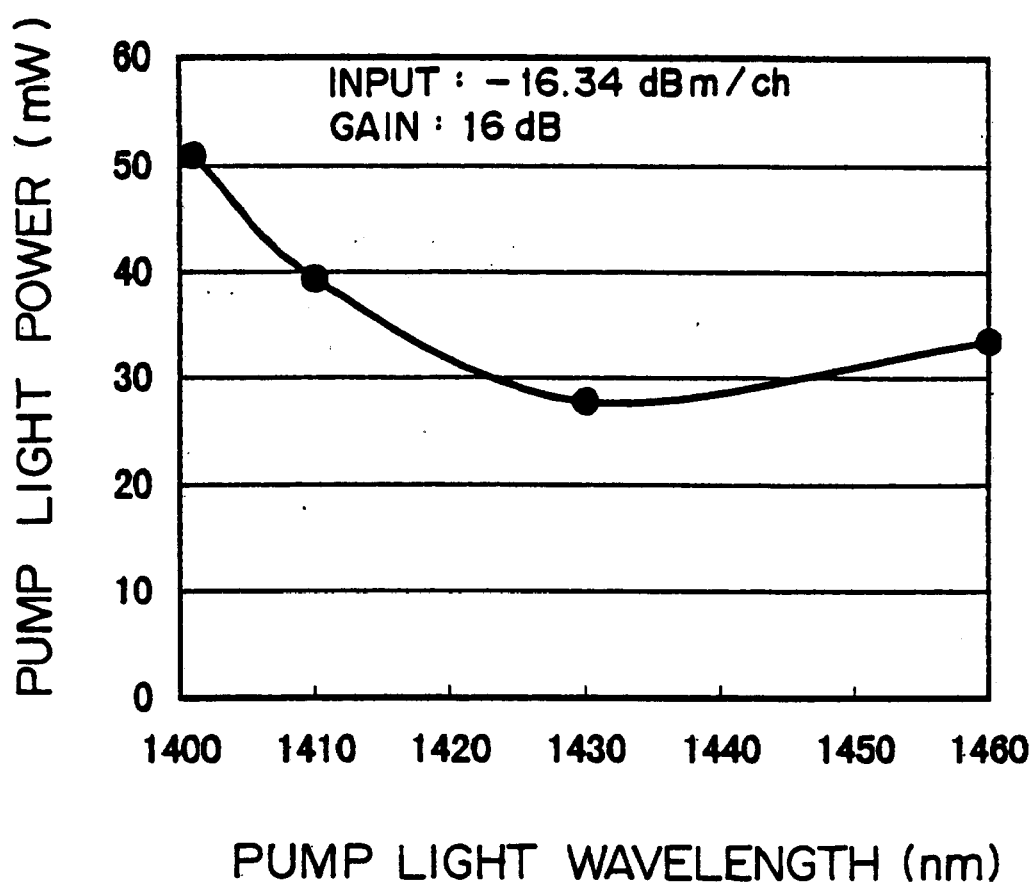
FIG. 11 shows the relationship between a pump light power needed to obtain a prescribed gain and a pump light wavelength.

FIG. 11 shows the relationship between pump light power needed to obtain a prescribed gain and the pump light wavelength. Here, pump light power needed to obtain a gain of 16 dB in an optical amplifier is shown. Taking into consideration the relationship with gain efficiency per unit length, in a wavelength band of 1400 to 1460 nm, basically, the shorter a wavelength, the larger the pump light power required. However, in the case of, for example, an EDFA for the L-band, in which a longer optical amplification medium should be used, the fact is taken into consideration that the longer the pump light effective length, the larger the pumping efficiency (=signal optical power/pump light power). Under these simulation conditions (EDF length, etc.), within a band of 1400 to 1460 nm, a bottom value has been obtained at approximately 1430 nm. Specifically, by using the pump light wavelength of 1430 nm, a desired gain can be obtained with a minimum optical power.

Next, the relationship between the deviation and the inversion population ratio is described.

FIG. 12 shows the relationship between the deviation and the inversion population ratio. In this example, the pump light wavelength is within the 0.98 $\mu$m band. The gain of an optical amplifier is 16 dB. The inversion population ratio shown in FIG. 12 is obtained when there is only signal light (ch33) with an input power of 21.34 dBm.

As described above with reference to FIG. 3, basically, the longer the EDF length, the lower the inversion population ratio. However, if the EDF is short, the deviation of signal light of ch33 is positive and if the EDF length exceeds a prescribed length, the deviation becomes negative. That is, if the EDF length exceeds a prescribed value, the deviation (output power is lowered) occurs. In this example, when the EDF length exceeds approximately 35 m, the deviation (output power is lowered) occurs.

As described above, the deviation occurs when an EDF length exceeds a threshold value. The inversion population ratio corresponding to the threshold value depends on neither the input power of signal light nor the pump light wavelength and becomes constant. In this example, when the EDF length is approximately 35 m, the deviation is zero and a inversion population ratio at the output end is 0.17.

Figure 13B:
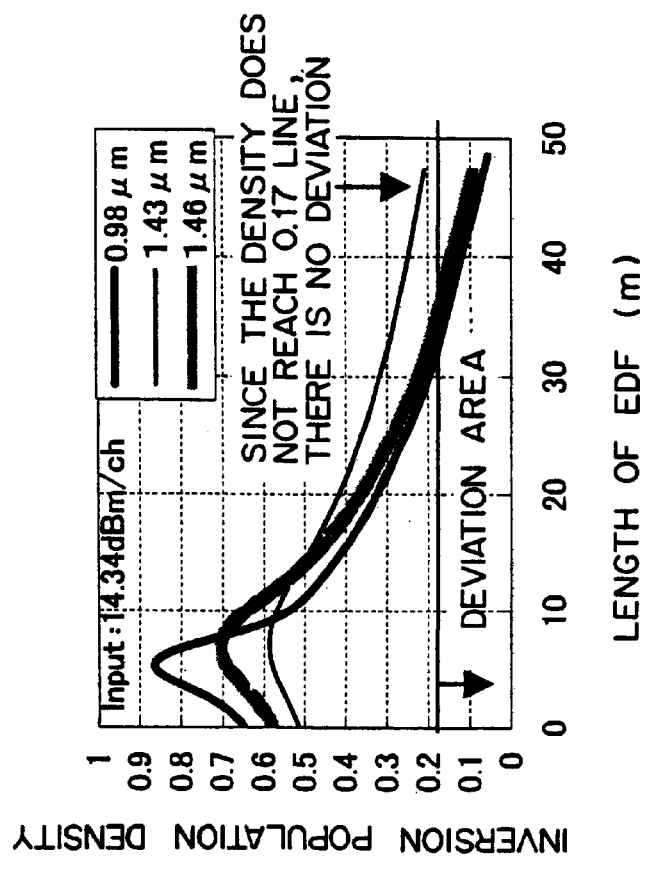
FIGS. 13A and 13B show the simulation results obtained when the pump light wavelength and the input power of signal light are changed.
Figure 13A:
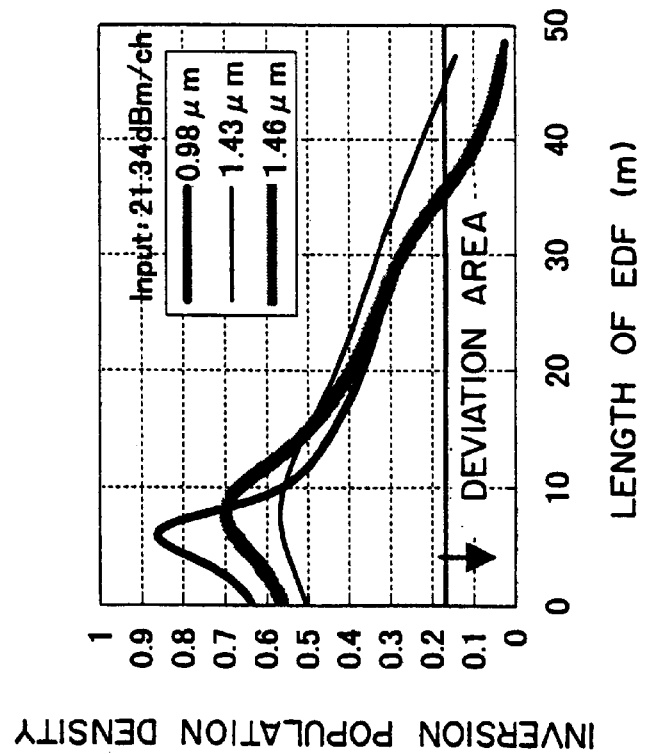

FIGS. 13A and 13B show the simulation results obtained when changing the pump light wavelength and the input power of signal light. In FIGS. 13A and 13B, the input powers of two signal lights are −21.34 dBm/ch and −14.34 dBm/ch, respectively. Three pump light wavelengths are set for each of the input powers.

In these simulations, it has been confirmed that the deviation becomes zero when the inversion population ratio is 0.17, and the negative deviation (lowering the output power) occurs when the ratio is less than 0.17. If in FIG. 13B, the pump light wavelength is 1.43 $\mu$m, a inversion population ratio is always more than 0.17 and there is no deviation.

As described above, the deviation occurs when the inversion population ratio at the output end of an optical amplification medium drops below a specific threshold value. In the example shown in FIG. 12, the deviation occurs when the inversion population ratio at the output end of an erbium-doped fiber is less than 0.17. Therefore, if the inversion population ration at the output end of an erbium-doped fiber is designed so as to be more than the threshold value, there is no deviation. Specifically, in the example shown in FIG. 12, if the inversion population ration at the output end of an erbium-doped fiber is designed so as to be more than 0.17, there is no deviation.

Figure 14B:
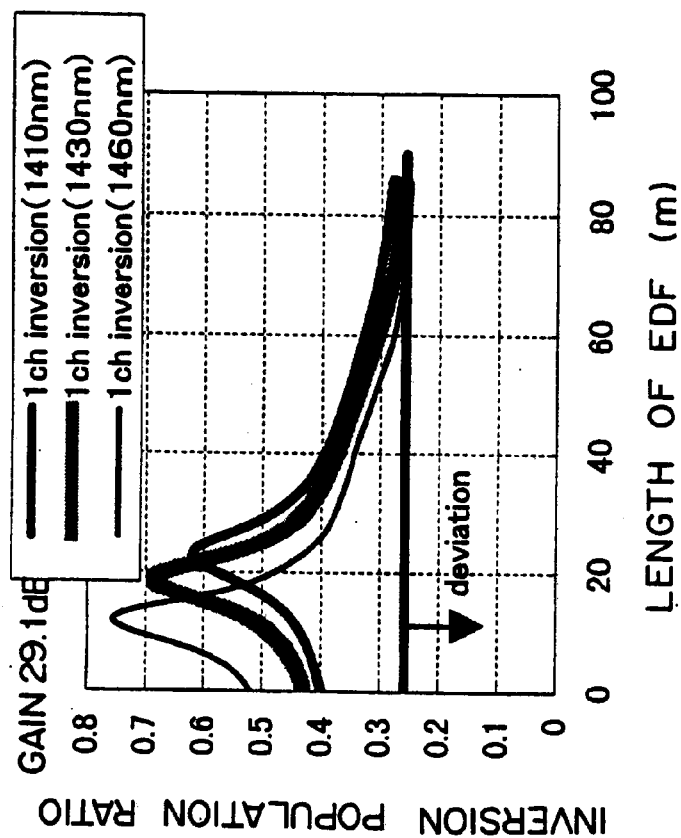
FIGS. 14A and 14B show the simulation results of the relationship between inversion population ratio and a deviation while changing the gain of an optical amplifier.
Figure 14A:
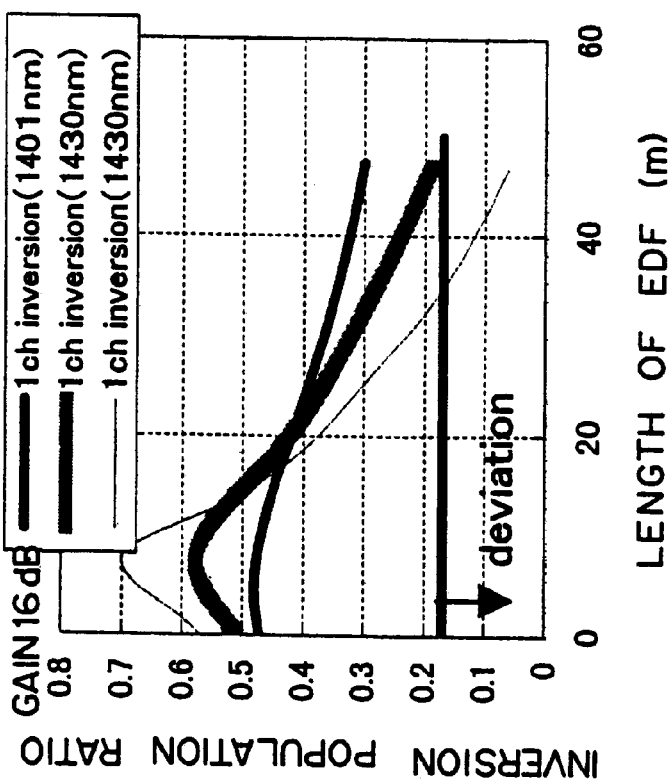

Although the threshold of the inversion population ratio related to the occurrence of the deviation depends on neither the input power of signal light nor the pump light wavelength, the threshold value depends on the gain of an optical amplifier. FIGS. 14A and 14B show the results of conducting the simulations shown in FIGS. 12, 13A and 13B while changing the gain of the optical amplifier. FIGS. 14A and 14B show the simulation results in the case where the gains of the optical amplifiers are 16 dB and 29.1 dB, respectively.

Figure 15:
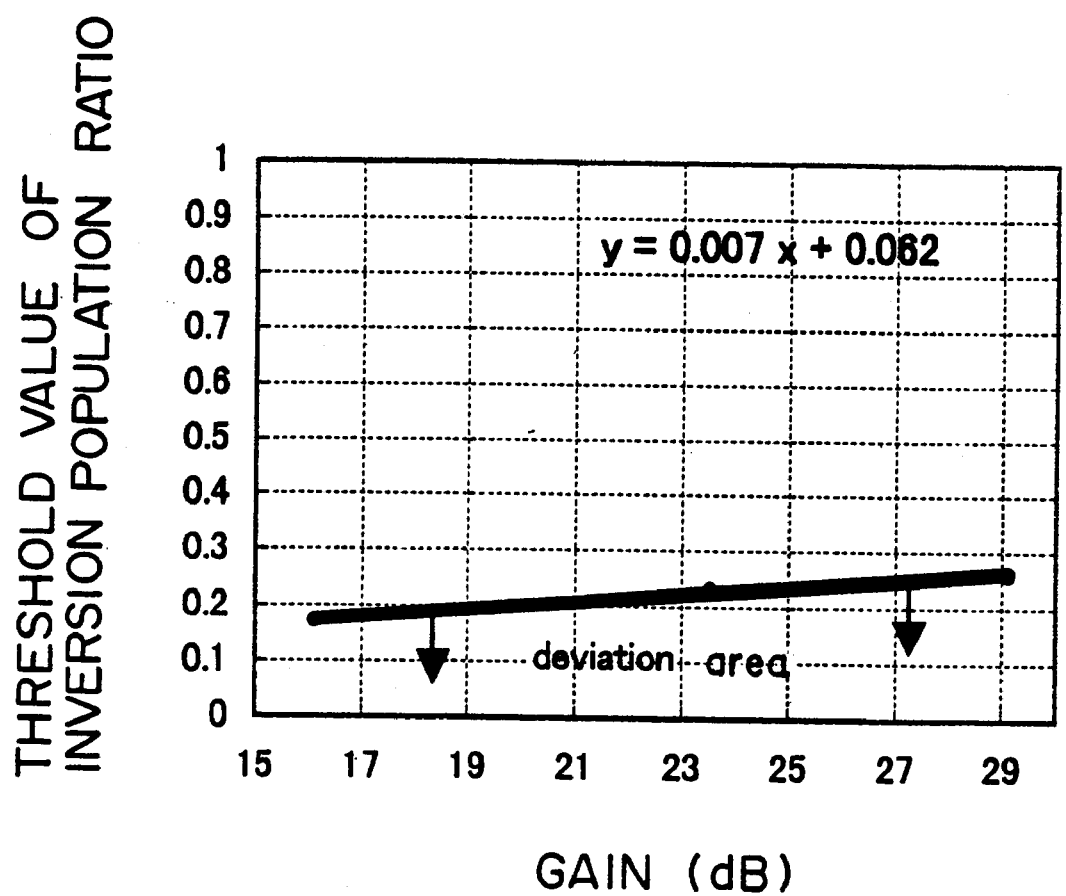
FIG. 15 shows the relationship between the threshold value of inversion population ratio and a gain.

In these simulations, if the gain of an optical amplifier is low, the threshold value of the inversion population ratio related to the occurrence of the deviation is also low, and if the gain is high, the threshold value also becomes high. Specifically, as shown in FIG. 15, the threshold value of the inversion population ratio is almost proportional to the gain of an optical amplifier. If the threshold value of the inversion population ratio and the gain of an optical amplifier are "Y" and "X", respectively, the following equation is satisfied.

$$Y=0.007X+0.062$$

Therefore, in the design of an erbium-doped fiber optical amplifier, first the threshold value of the inversion population ratio is calculated according to the equation described above. Then, the pump light wavelength and an excitation density are set in such a way that the inversion population ratio at the output end of an erbium-doped fiber can be more than the threshold value. If the optical amplifier is designed in this procedure, the deviation can be efficiently suppressed without unnecessarily degrading other characteristics (noise figure, etc.).

The inversion population ratio is a simple parameter derived from the amplification characteristic of an optical amplification medium using an induced emission. Therefore, it is judged that even if the host glass changes from the silica, for example, to the fluoride, the threshold value of the inversion population ration hardly changes.

Figure 16:
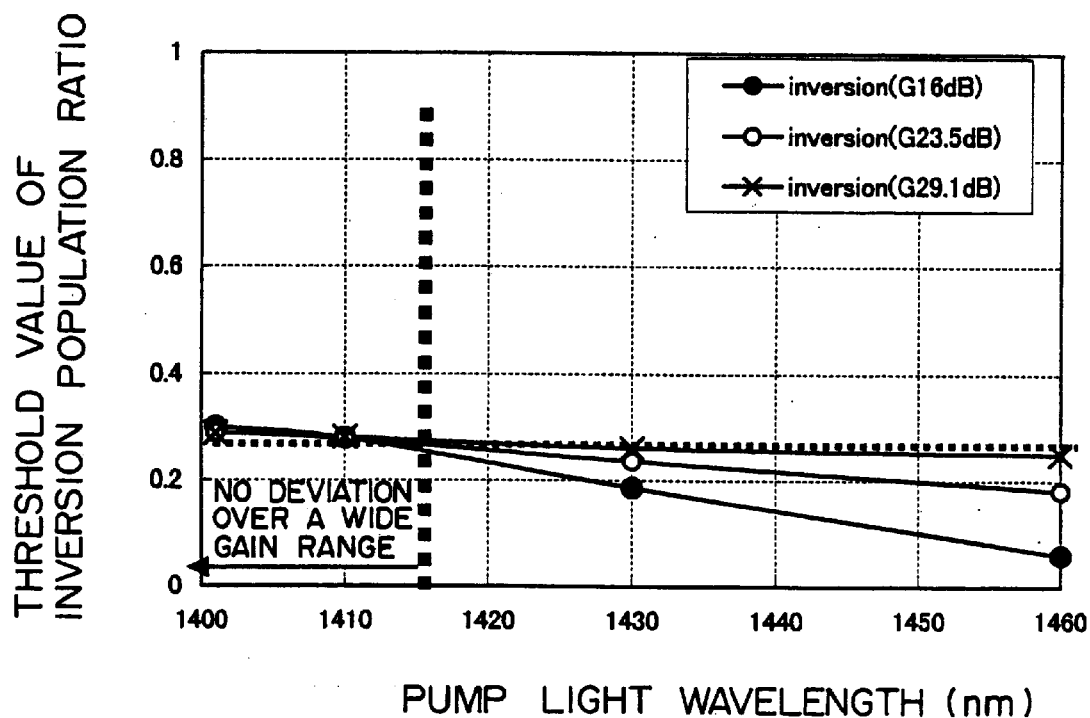
FIG. 16 shows the relationship between the threshold value of inversion population ratio and a pump light wavelength.

FIG. 16 shows the relationship between the threshold value of the inversion population ratio and the pump light wavelength. Here, the inversion population ratio obtained at the output end of erbium-doped silica fiber used as an optical amplification medium, when signal light for one channel is inputted in the fiber.

As described above in reference to FIG. 15, the higher the gain of an optical amplifier, the larger the threshold value of the inversion population ratio. In the embodiment, when the gain of the optical amplifier is 29.1 dB, the threshold value is 0.26. Therefore, if the amplifier is designed so that the inversion population ratio at the output end of the erbium fiber is 0.26 or more, there is no deviation in the range where the gain is less than 29 dB. However, as shown in FIG. 16, in order to obtain the inversion population ratio of 0.26 or more at the output end of the erbium-doped fiber, the pump light wavelength should be shorter than 1415 nm. As described above in reference to FIG. 10, in order to suppress the degradation of noise figure less than 2 dB comparing to the prior art configuration, the pump light wavelength should be longer than 1400 nm. Therefore, in order to avoid the deviation over a wide gain range and to suppress the degradation of the noise figure to within the allowable range, it is preferable that the pump light wavelength should be within the range of 1400 to 1415 nm.

The optical amplifier of this embodiment (in particular, the optical amplifier described above in reference to FIGS. 8A and 8B) is configured so that the deviation can be suppressed by obtaining a longer pump light effective length than that of the existing optical amplifier. However, in the case that the effective length of pump light becomes long, the energy of the pump light remains even at the output end of an erbium-doped fiber. Therefore, in the optical amplifier of this embodiment, the remaining pump light is outputted from the output end of the erbium-doped fiber.

Figure 17B:
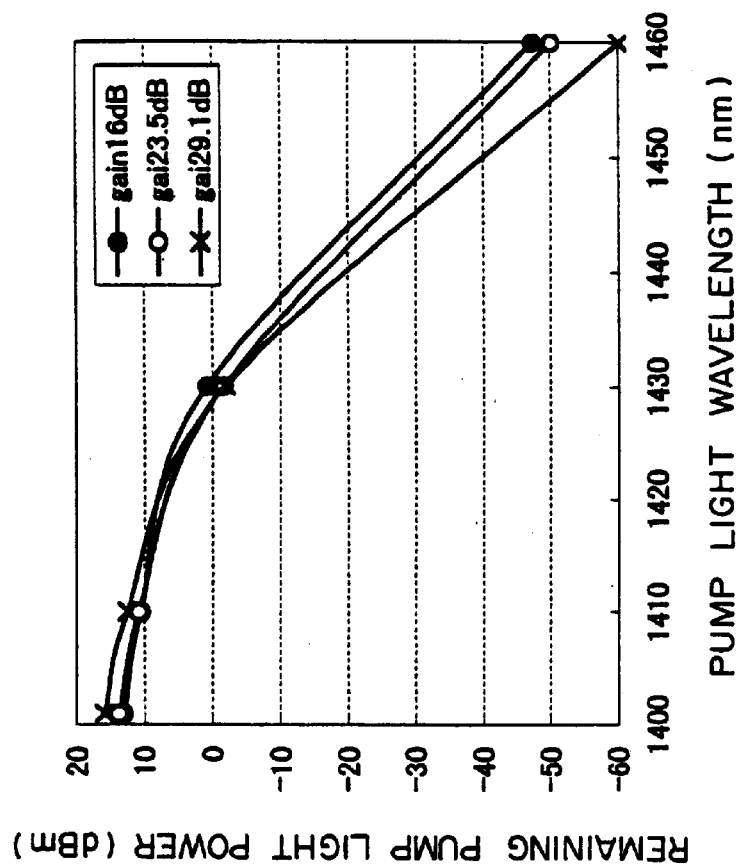
FIG. 17B shows the relationship between remaining pump light power and a pump light wavelength.
Figure 17A:
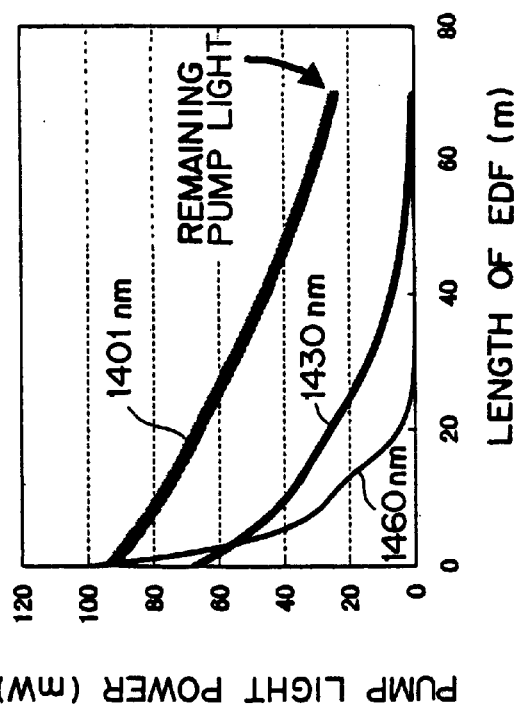
FIG. 17A shows the relationship between an EDFA length and the pump light power.

FIG. 17A shows the relationship between the EDF length and the pump light power. In the wavelength range of 1400 to 1460 nm, the longer the pump light wavelength, the more energy of the pump light is absorbed in the erbium-doped fiber. In other words, in this wavelength range, the shorter the wavelength, the farther pump light is propagated. In the example shown in FIG. 17A, if the EDF length is 40 m, the output power of the pump light with a wavelength of 1460 nm is almost zero, however, the output power of pump light with a wavelength of 1400 nm is approximately 50 mW.

FIG. 17B shows the relationship between a remaining pump light power and the pump light wavelength. FIG. 17B shows the remaining pump light power obtained at the output end of the erbium-doped fiber when the EDF length and the input power of pump light are adjusted so that prescribed gains (16 dB, 23.5 dB and 29.1 dB) can be obtained. In the wavelength range of 1400 to 1460 nm, the shorter the pump light wavelength, the higher the remaining pump light power. In particular, in the wavelength range of 1400 to 1430 nm, the pump light power outputted from the EDF is fairly high.

When the remaining pump light power is high, the control error of an optical amplifier becomes large and there is a possibility that Raman-amplification is performed and a non-linear effect degrades the transmission characteristic on the transmission line. Therefore, in the optical amplifier of this embodiment, it is preferable that the influence of the remaining pump light outputted from the EDF is eliminated.

Figure 18A:
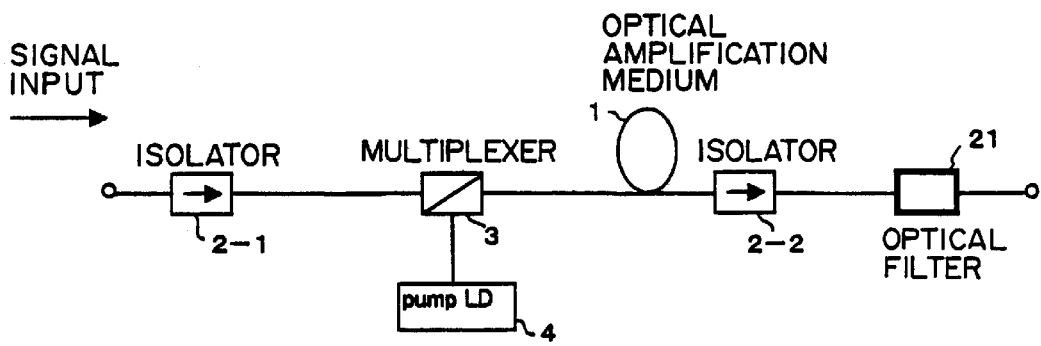
FIGS. 18A and 18B show optical amplifiers provided with an optical filter for cutting remaining pump light.

In the example shown in FIG. 18A, an optical filter 21 for cutting the pump light wavelength is provided on the output side of an optical amplifier. In this configuration, pump light factor is eliminated from a transmission line for transmitting signal light.

Figure 18B:
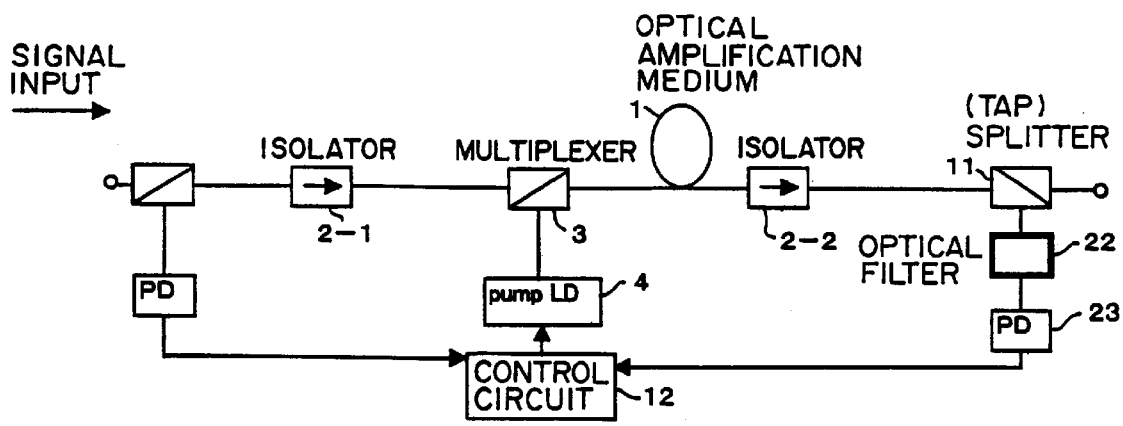

In the example shown in FIG. 18B, an optical filter 22 for cutting the pump light factor from split light used to control the output power or gain of the optical amplifier is provided. Specifically, light (including both signal light and remaining pump light) outputted from the optical transmission medium (erbium-doped fiber) 1 is split off by an optical splitter 11. The optical filter 22 cuts the pump light factor from the split-off portion of light split by the optical splitter 11. Then, a photo diode (PD) 23 detects the power of the light from which the pump light factor is cut. Therefore, a control circuit 12 can control the pump light source (LD) 4 based on a multi-wavelength optical power without the remaining pump light. The control circuit 12 must detect input optical power when performing gain control, there is no need to provide an optical filter on the input side of an optical amplifier since the input light does not include pump light.

In the example shown in FIG. 19A, the remaining pump light is used for Raman amplification. Specifically, a demultiplexer 31 demultiplexes input multi-wavelength light into the C-band signal and the L-band signal. As shown in FIG. 19B, the L-band port of the demultiplexer 31 has the loss characteristic of cutting the C-band. As shown in FIG. 19C, the C-band port has the loss characteristic of passing only the C-band. An EDFA 32 for the C-band amplifies the C-band signal demultiplexed by the demultiplexer 31, while an EDFA 33 for the L-band amplifies the L-band signal. Then, a multiplexer 34 multiplexes the C-band and L-band signals amplified by corresponding amplifiers and outputs the multiplexed light. In this apparatus, since the L-band EDFA 33 is designed so that the effective length of pump light can be longer than a prescribed value, fairly strong remaining pump light is outputted.

On the output side of the L-band EDFA 33, a WDM coupler 35 for demultiplexing the pump light from the signal light. This WDM coupler 35 guides the signal light to the multiplexer 34 and guides the pump light to a WDM coupler 36 provided on the input side of the L-band EDFA 33. The WDM coupler 36 guides the signal light from the demultiplexer 31 to the L-band EDFA 33 and guides the pump light from the WDM coupler 35 to the demultiplexer 31. Here, the L-band port of the demultiplexer 31 has the loss characteristic shown in FIG. 19B. Therefore, the remaining pump light outputted from the L-band EDFA 33 is guided to a transmission line on the input side of the optical amplifier through the WDM coupler 35, the WDM coupler 36 and the demultiplexer 31.

Raman amplification has a gain in a frequency band by 13.2 THz smaller than the frequency of pump light supplied to a transmission medium. Here, in a 1.55 $\mu$m-band, 13.2 THz corresponds to approximately 100 nm. Therefore, if the pump light wavelength for Raman amplification is, for example, 1430 nm, a gain can be obtained in a wavelength band around 1530 nm. Therefore, in this case, Raman amplification for the C-band is performed.

On the other hand, for the L-band EDFA 33, the pump light wavelength within a range of 1400 to 1460 nm is used. In this case, if the pump light wavelength used in the L-band EDFA 33 is 1430 nm, the remaining pump light can be used as pump light for Raman-amplification of the C-band. Therefore, if as shown in FIG. 19A, the remaining pump light outputted from the L-band EDFA 33 is guided to the transmission line on the input side of an optical amplifier, Raman amplification for the C-band is performed.

In this way, in the optical amplifier shown in FIG. 19A, the remaining pump light is prevented from being transmitted on the transmission line on the output side together with signal light. Simultaneously, the remaining pump light is used for the Raman amplification of signal light. Therefore, this configuration not only suppresses the degradation of the transmission characteristic, but also contributes to the improvement of the transmission characteristic.

In a system for transmitting multi-wavelength light over a long distance, the optical power of signal light on the short wavelength area is shifted toward the long wavelength area by Raman effect between signals in a transmission line and signals on the short wavelength area may degrade. For example, in a system for collectively transmitting the C-band and the L-band, signals located in the C-band may degrade. The degradation amount varies depending on a signal optical power, an wavelength interval between signals and the like, and the amount sometimes reaches approximately 5 dB. Therefore, in the systems described above, it is effective to provide a Raman-amplifier (concentrated type or distributed type) for amplifying the C-band on the input side of an EDFA to compensate for the gain degradation of signal light on the shorter wavelength area (the C-band).

Figure 20:
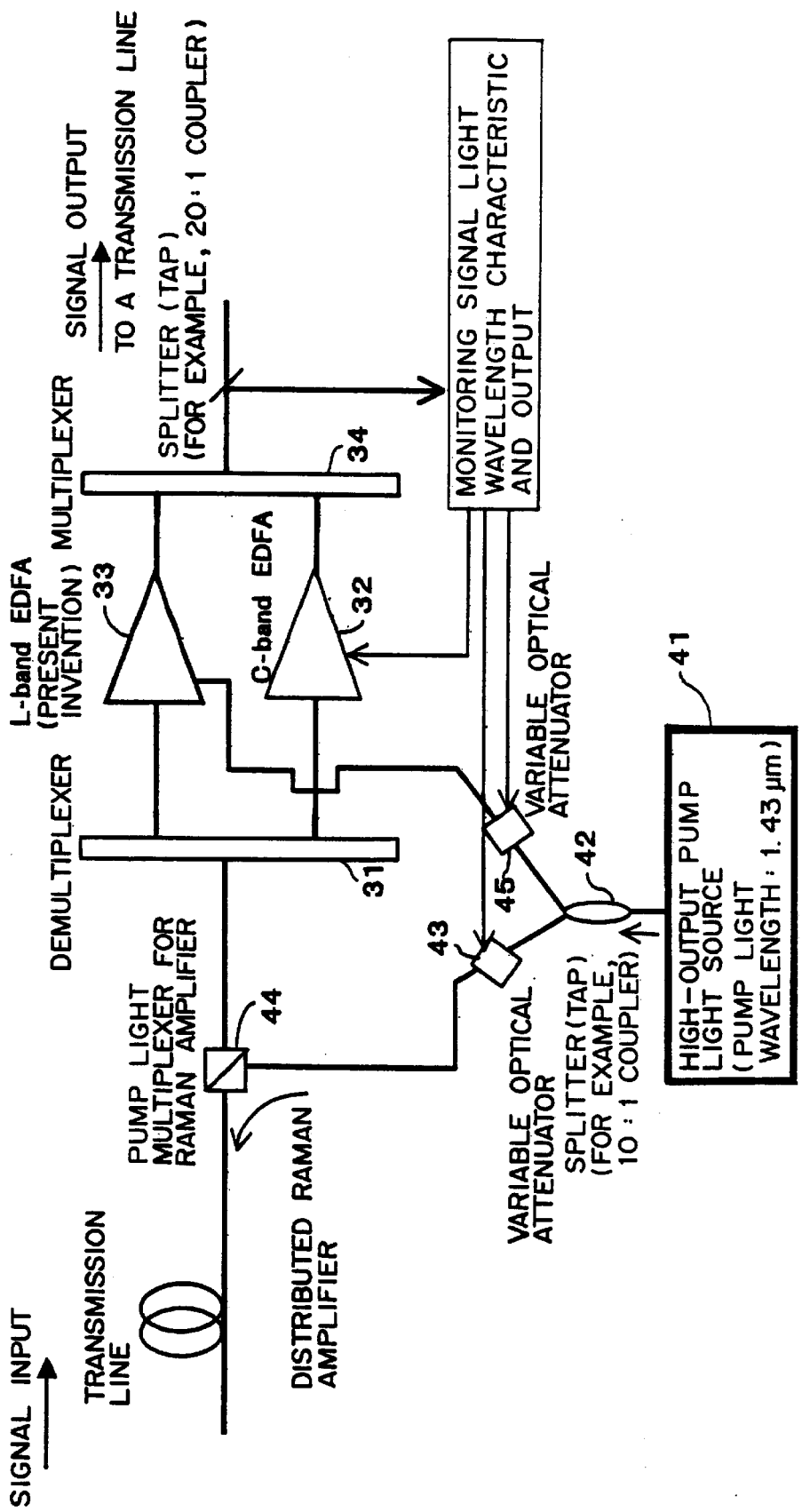
FIG. 20 shows an optical amplifier in which pump light source is shared for EDFA and Raman amplification.

FIG. 20 shows an optical amplifier in which pump light source is shared for the EDFA and the Raman amplification. This optical amplifier comprises the C-band EDFA 32 and the L-band EDFA 33. The pump light wavelength used by the L-band EDFA 33 is 1430 nm. Raman amplification is performed in a transmission line on the input side, and the pump light wavelength for that purpose is also 1430 nm.

The pump light source 41 generates and outputs pump light with a wavelength of 1430 nm. An optical splitter 42, which can be implemented by an optical coupler, splits the generated pump light. The split ratio is, for example, "10:1". Here, one split-off pump light is guided to a multiplexer 44 through a variable optical attenuator 43. Then, the multiplexer 44 supplies a transmission line with the pump light. Thus, the Raman amplification for signal light located in the C-band can be performed in the transmission line. The other split-off pump light is guided to the L-band EDFA 33 through a variable optical attenuator 45. Thus, signal light located in the L-band is amplified by the L-band EDFA 33. To the C-band EDFA 32, pump light is supplied by another pump light source, which is not shown in FIG. 20.

The attenuation amounts of the variable optical attenuators 43 and 45 can be adjusted, for example, based on the power of multi-wavelength light outputted from this optical amplifier. In this case, the variable optical attenuators 43 and 45 can be independently controlled in such a way that, for example, each optical power of the C-band and the L-band is appropriately adjusted.

As described above, since in the optical amplifier shown in FIG. 20, both pump light for an EDFA and pump light for Raman amplification are generated by one pump light source, the miniaturization of an optical amplifier can be advanced and the reduction of component costs can be expected.

Figure 21:
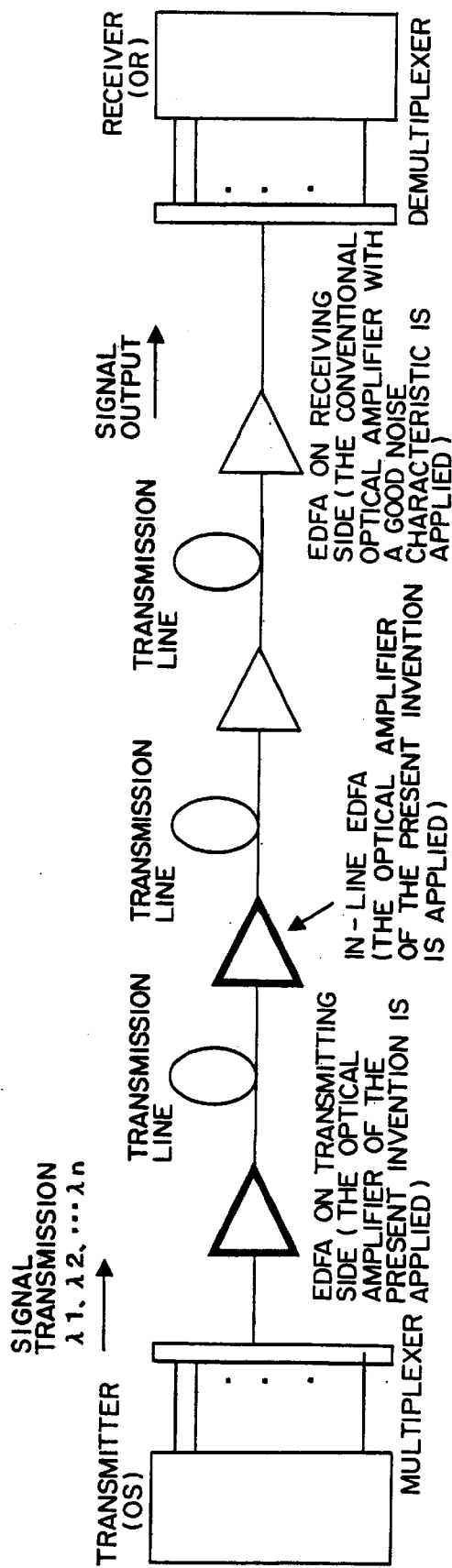
FIG. 21 shows the configuration of a long-haul optical transmission system using the optical amplifier of the embodiment.

FIG. 21 shows the configuration of a long-haul optical transmission system using the optical amplifier of the embodiment.

In a long-haul optical transmission system, usually a plurality of optical amplifiers are provided on a transmission line. Here, if the deviation occurs in an arbitrary optical amplifier of the plurality of these optical amplifiers, a transmission error occurs in this system. Therefore, in this system it is preferable to use the optical amplifier of the above embodiments for all the optical amplifiers on the transmission line.

However, as described above with reference to FIG. 10, in the optical amplifier of the embodiments, there is a possibility that the noise characteristic degrades. Therefore, in the design of a transmission system, the deviation suppression effect, a noise character, costs and the like must be comprehensively taken into consideration.

Specifically, the optical amplifier of the embodiments is provided in a location where strict noise characteristic is not required. For example, as shown in FIG. 21, the optical amplifier of the embodiments is used as an optical amplifier on a transmitting side or an in-line optical amplifier located on the transmission line. However, on a receiving side where strict noise characteristic is required, a multi-stage EDFA unit, which is described later, should be used. Although the multi-stage EDFA unit is an optical amplifier for avoiding the deviation while maintaining a good noise characteristic, not only the size is large, but also the production cost is high. Therefore, in order to suppress the cost of the entire system, the number of multi-stage EDFA units must be reduced as much as possible.

As described above, in an optical transmission system with a plurality of optical amplifiers, the deviation can be avoided while suppressing the cost of the entire system, by providing the optical amplifier of the embodiments at an appropriate location.

Figure 22:
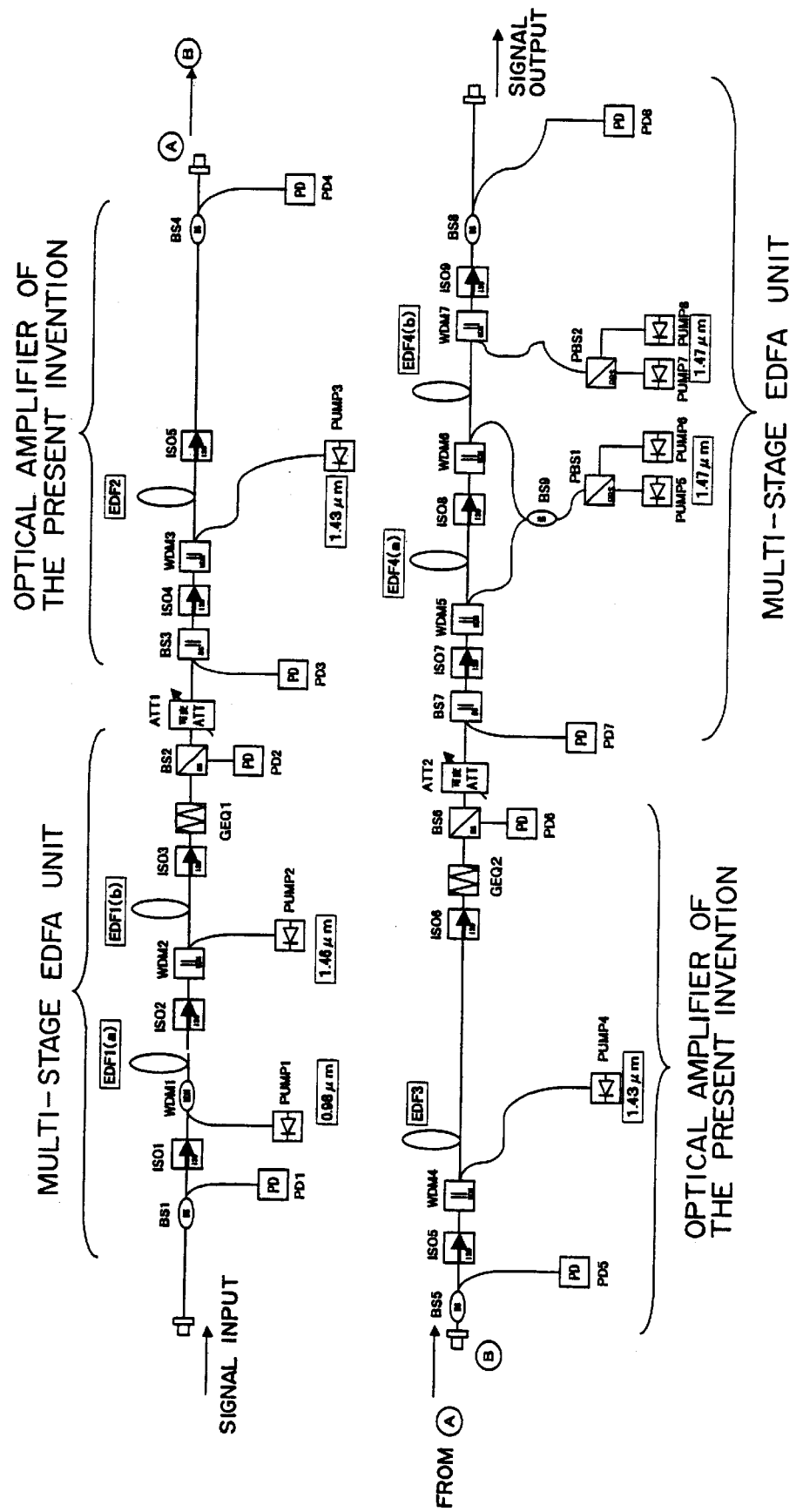
FIG. 22 shows the configuration of an optical amplification apparatus to which the optical amplifier of the embodiment is applied.

FIG. 22 shows the configuration of an optical amplification apparatus including the optical amplifier of the embodiments. This optical amplification device comprises four optical amplifiers connected in series. The multi-stage EDFA unit is implemented in the first stage and the final stage. The optical amplifier of the embodiments is implemented in the second stage and the third stage.

The multi-stage EDFA unit further comprises two EDFs connected in series. Here, since both a good noise characteristic and a fairly large gain are required in the first stage of amplification, pump light with a wavelength of 0.98 $\mu$m-band and pump light with a wavelength of 1.48 $\mu$m-band are used in the first-stage amplifier. On the other hand, since both a large gain and a good noise characteristic are required in the last stage of amplification, a plurality of pump light sources, each of which generates pump light with a wavelength of 1.48 $\mu$m band, are provided in the final-stage amplifier.

In the second stage and third stage of amplification, strict noise characteristic is not required. Therefore, the optical amplifier of the embodiments is used in the second stage and third stage. In the optical amplifier of the embodiments, for example, pump light with a wavelength of 1.43 $\mu$m is used.

Between the first-stage amplifier and second-stage amplifier, and between the third-stage amplifier and last-stage amplifier, both gain equalizers GEQ1 and GEQ2 for equalizing the optical powers of a plurality of signal lights included in multi-wavelength light and variable optical attenuators ATT1 and ATT2 for adjusting the optical powers of the multi-wavelength light and performing constant-output control are provided, respectively. Between the second-stage amplifier and third-stage amplifier, a dispersion compensation fiber, which is not shown in FIG. 22, is provided.

Each of the amplifier in the first stage through the final stage is implemented as follows.

First-Stage Optical Amplifier

In the first-stage optical amplifier, the EDF which obtains a prescribed gain at the inversion population ratio needed to obtain a flat wavelength characteristic in the 1.58 $\mu$m band (1570 to 1605 nm) is implemented by the first EDF (EDF1 (a)) and the second EDF (EDF1 (b)).

The first WDM coupler (WDM1) guides multiplexed light of pump light with 0.98 $\mu$m from the first pump light source (Puump1) and multi-wavelength light passes through the first optical branching coupler (BS1) and an optical isolator (ISO1), to the first EDF (EDF1 (a)) The first EDF (EDF1 (a)) amplifies the multi-wavelength light using the pump light and outputs the amplified multi-wavelength light to the second WDM coupler (WDM2) through an optical isolator (ISO2).

The second WDM coupler (WDM2) multiplexes the multi-wavelength light and the pump light with 1.48 μm from the second pump light source (Pump2), and outputs the multiplexed light to the second EDF (EDF1 (b)).

The second EDF (EDF1 (b)) amplifies the multi-wavelength light using the pump light from the second pump light source (Pump2).

The first and second optical monitors (PD1 and PD2) monitor corresponding split-off light branched by the first and second optical branching couplers (BS1 and BS2), respectively. Then, the output powers of the first and second optical light sources (Pump1 and Pump2) are controlled based on the monitoring results, and the gain of the multi-stage EDFA unit composed of the first and second EDFs (EDF1 (a) and EDF1 (b)) is adjusted.

The multi-wavelength light amplified by the first-stage optical amplifier (multi-stage EDFA unit) is guided to the second-stage optical amplifier through the gain equalizer (GEQ1) and the optical variable attenuator (ATT1).

Second-Stage Optical Amplifier

In the second-stage optical amplifier, the EDF which obtains a prescribed gain at the inversion population ratio needed to obtain a flat wavelength characteristic in the 1.58 μm band (1570 to 1610 nm) is implemented by the third EDF (EDF2).

The multi-wavelength light from the first-stage optical amplifier is inputted to the third EDF (EDF2) through a third optical branching coupler (BS3), an optical isolator (ISO4) and the third WDM coupler (WDM3). The third EDF (EDF2) receives pump light with approximately 1.43 μm generated by the third pump light source (Pump3) through the third WDM coupler (WDM3), and amplifies the multi-wavelength light using the pump light.

The multi-wavelength light amplified by the third EDF (EDF2) is guided to the third-stage optical amplifier through an optical isolator (ISO5) and an optical branching coupler (BS4).

An optical connector connects the second-stage optical amplifier and the third-stage optical amplifier. The third and fourth optical monitors (PD3 and PD4) monitor corresponding split-off light branched by the third and fourth optical branching couplers (BS3 and BS4), respectively, and the gain of the second-stage optical amplifier is adjusted by controlling the optical power and wavelength of the pump light from the pump light source (Pump3) based on the monitoring results.

Third-Stage Optical Amplifier

In the third-stage optical amplifier, the EDF which obtains a prescribed gain at the inversion population ratio needed to obtain a flat wavelength characteristic in the 1.58 μm band (1570 to 1610 nm) is implemented by the fourth EDF (EDF3).

The multi-wavelength light from the second-stage optical amplifier is inputted to the fourth EDF (EDF3) through the fifth optical branching coupler (BS5), an optical isolator (ISO5) and the fourth WDM coupler (WDM4) The fourth EDF (EDF3) receives pump light with approximately 1.43 μm from the fourth pump light source (Pump4) through the fourth WDM coupler (WDM4), and amplifies the multi-wavelength light using the pump light.

The multi-wavelength light amplified by the fourth EDF (EDF3) is guided to the fourth-stage optical amplifier through an optical isolator (ISO6), the gain equalizer (GEQ2), an optical branching coupler (BS6) and the optical variable attenuator (ATT2).

The fifth and sixth optical monitors (PD5 and PD6) monitor corresponding split-off light branched by the fifth and sixth optical branching couplers (BS5 and BS6), respectively, and the gain of the third-stage optical amplifier is adjusted by controlling the optical power and wavelength of pump light from the pump light source (Pump4) based on the monitoring results.

Final (Fourth)-Stage Optical Amplifier

In the final-stage (fourth-stage) optical amplifier, similar to the first stage, the EDF which obtains a prescribed gain at the inversion population ratio needed to obtain a flat wavelength characteristic in the 1.58 μm band (1570 to 1605 nm) is implemented by the fifth EDF (EDF4 (a)) and the sixth EDF (EDF4 (b))

The multi-wavelength light from the third-stage optical amplifier is inputted to the fifth EDF (EDF4 (a)) through the seventh branching coupler (BS7), an optical isolator (ISO7) and the fifth WDM coupler (WDM5).

The fifth WDM coupler (WDM5) multiplexes pump light with 1.47 μm generated by the pump light sources (Pump5 and Pump6) and the multi-wavelength light from the third-stage optical amplifier. Here, the pump light is provided to the fifth WDM coupler (WDM5) via the ninth optical branching coupler (BS9) after combined by polarization beam coupler (PBS1).

The fifth EDF (EDF4 (a)) amplifies the multi-wavelength light from the third-stage optical amplifier using pump light from the fifth WDM coupler (WDM5). The output of the fifth EDF (EDF4 (a)) is guided to the sixth EDF (EDF4 (b)) through an optical isolator (ISO8) and the sixth WDM coupler (WDM6).

The sixth WDM coupler (WDM6) multiplexes pump light split-off by the optical branching coupler (BS9) and the output of the fifth EDF (EDF4 (a)), and outputs the multiplexed result to the sixth EDF (EDF4 (b)).

The seventh WDM coupler (WDM7) guides pump light with 1.47 μm generated by the pump light sources (Pump7 and Pump8) and combined by a polarization beam coupler (PBS2) to the sixth EDF (EDF4 (b)).

The sixth EDF (EDF4 (b)) amplifies the multi-wavelength light using both the pump light from the WDM coupler (WDM6) and the WDM coupler (WDM7). Then, the multi-wavelength light amplified by the sixth EDF (EDF4 (b)) is outputted through the seventh WDM coupler (WDM7), an optical isolator (ISO9) and an optical branching coupler (BS8).

The seven and eighth optical monitors (PD7 and PD8) monitor corresponding split-off light branched by the seventh and eighth optical branching couplers (BS7 and BS8), respectively, and the gain of the final (fourth)-stage optical amplifier is adjusted by controlling the optical power and wavelength of pump light from the pump light sources (Pump5-8) based on the monitoring results.

As described above, the occurrence of the deviation can be avoided by designing the optical amplifier of the embodiments so that the effective length of pump light in an optical amplification medium is longer than a prescribed value or that the inversion population ratio at the output end of an optical amplification medium is larger than a prescribed value.

In the above embodiments, it has been described that the deviation occurs when a transition from a state where signal light on the short wavelength area of multi-wavelength light is input into a state where the signal light is turn-off occurs, however, the similar deviation can also occur when the power of the signal light on the short wavelength area is lowered. The optical amplifier of the embodiments can effectively avoid the deviation in such a case. Here, the state where the power of signal light on the short wavelength area that is inputted to an optical amplification medium is greatly lowered can be regarded as a state where the signal light is substantially turned-off.

In the above embodiments, the reference value of the effective length of pump light or the reference value of a inversion population ratio at the output end of an optical amplification medium used in the design of an optical amplifier is determined mainly assuming the state where the deviation of the output optical power should be zero, however, the present invention is not limited to this method. For example, the effective length or inversion population ratio can be determined so that a specific deviation can be allowed in order to avoid the degradation of the noise character.

Furthermore, in the above embodiments, the phenomenon that the power of signal light on the long wavelength area is lowered when the signal light on the short wavelength area of multi-wavelength light is turned off is focused; the present invention is not limited to this phenomenon. Specifically, the present invention is also applicable in order to avoid the phenomenon that when signal light with arbitrary wavelength in multi-wavelength light is turned off, the power of other signal light varies.

Furthermore, although for the host glass of an optical amplification medium, not only silica type, but also fluoride type, telluride type, bismuth type, phosphoric acid type and silicate type and the like are used, currently the silica type is the most suitable if are comprehensively compared from the viewpoints a high gain, a low noise, reliability and practicability and the like. Although for a material to be added to an optical fiber, not only erbium, but also praseodymium and the like can be used, erbium is the most suitable if they are also comprehensively compared from the viewpoints described above.

According to the present invention, since in an optical amplifier for amplifying multi-wavelength light, the effective length of pump light in an optical amplification medium or a inversion population ratio at the output end of the optical amplification medium is appropriately designed, the output power of remaining light is not lowered or slightly lowered, even if a part of the light in multi-wavelength light is turned off. Therefore, transmission error can be avoided in a receiver for receiving multi-wavelength light outputted from the optical amplifier.

What is claimed is:

1. An optical amplifier for amplifying wavelength division multiplexed (WDM) light having first signal light and second signal light, comprising:
    an optical fiber used as an optical amplification medium to amplify the WDM light; and
    a pump light source supplying the optical fiber with pump light, wherein
    a minimum distance that the pump light is propagated in the optical fiber is determined based on a power deviation of the second signal light output from the optical fiber not exceeding a predetermined threshold, when a transition occurs from a state in which the first signal light is input into the optical fiber to a state in which the first signal light is not substantially input into the optical fiber.

2. The optical amplifier according to claim 1, wherein a wavelength of the first signal light is less than a wavelength of the second signal light.

3. The optical amplifier according to claim 1, wherein the distance that the pump light is propagated in the optical fiber is determined based on the power of the second signal light output from the optical fiber, when the first signal light is substantially turned off, not being less than the power of the second signal light output from the optical fiber when the first signal light is input in the optical fiber.

4. The optical amplifier according to claim 1, wherein the pump light source outputs pump light with a wavelength determined based on the distance that the pump light is propagated in the optical fiber being greater than the minimum distance.

5. An optical amplifier for amplifying wavelength division multiplexed (WDM) light having first signal light and second signal light, comprising:
    an optical fiber used as an optical amplification medium to amplify the WDM light; and
    a pump light source supplying the optical fiber with pump light, wherein
    a minimum distance that the pump light is propagated in the optical fiber is determined based on a power deviation of the second signal light output from the optical fiber not exceeding a predetermined threshold, when a power of the first signal light in the WDM light is reduced.

6. An optical amplifier for amplifying wavelength division multiplexed (WDM) light having first signal light and second signal light, comprising:
    an optical fiber used as an optical amplification medium to amplify the WDM light; and
    a pump light source supplying the optical fiber with pump light, wherein
    a minimum inversion population ratio at an output end of the optical fiber is determined based on a power deviation of the second signal light output from the optical fiber not exceeding a predetermined threshold, when a transition occurs from a state in which the first signal light is input into the optical fiber to a state in which the first signal light is not substantially input into the optical fiber.

7. The optical amplifier according to claim 6, wherein a wavelength of the first signal light is less than a wavelength of the second signal light.

8. The optical amplifier according to claim 6, wherein the inversion population ratio at the output end of the optical fiber is determined based on the power of the second signal light output from the optical fiber, when the first signal light is substantially turned off, is not less than the power of the second signal light output from the optical fiber when the first signal light is input in the optical fiber.

9. The optical amplifier according to claim 6, wherein the minimum inversion population ratio is determined based on a gain of the optical amplifier.

10. An optical amplifier for amplifying wavelength division multiplexed (WDM) light having first signal light and second signal light, comprising:
    an optical fiber used as an optical amplification medium to amplify the WDM light; and
    a pump light source supplying the optical fiber with pump light, wherein
    a minimum inversion population ratio at an output end of the optical fiber is determined based on a power deviation of the second signal light output from the optical fiber not exceeding a predetermined threshold, when a power of the first signal light in the WDM light reduced.

11. The optical amplifier according to claim 1, further comprising an optical device guiding remaining pump light output from the optical fiber to a transmission line that transmits the WDM light to an input side of the optical amplifier.

12. The optical amplifier according to claim 1, wherein the optical fiber is a silica optical fiber.

13. The optical amplifier according to claim 1, wherein the optical fiber is an erbium-doped fiber.

14. An optical transmission system having a plurality of optical amplifiers to amplify wavelength division multiplexed (WDM) light between a transmitter and a receiver, each of at least one of the plurality of optical amplifiers comprising:

an optical fiber used as an optical amplification medium to amplify the WDM light; and a pump light source supplying the optical fiber with pump light, wherein a minimum distance that the pump light is propagated in the optical fiber or a minimum inversion population ratio at an output end of the optical fiber is determined based on a power deviation of the second signal light output from the optical fiber not exceeding a predetermined threshold, when a transition occurs from a state in which the first signal light is input into the optical fiber to a state in which the first signal light is not substantially input into the optical fiber.

\* \* \* \* \*